United States Patent
Inoue et al.

(10) Patent No.: US 10,046,763 B2
(45) Date of Patent: Aug. 14, 2018

(54) CONTROL SYSTEM FOR VEHICLE

(71) Applicant: TOYOTA JIDOSHA KABUSHIKI KAISHA, Toyota-shi, Aichi-ken (JP)

(72) Inventors: Takashi Inoue, Kasugai (JP); Sokfan Yee, Toyota (JP); Tetsuya Taira, Nisshin (JP); Keiji Yamashita, Seto (JP); Nobuyuki Tomatsu, Toyota (JP); Takato Masuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 15/159,290

(22) Filed: May 19, 2016

(65) Prior Publication Data
US 2016/0347313 A1   Dec. 1, 2016

(30) Foreign Application Priority Data
May 26, 2015 (JP) .................... 2015-106825

(51) Int. Cl.
*B60W 30/14* (2006.01)
*B60K 35/00* (2006.01)

(52) U.S. Cl.
CPC .......... *B60W 30/146* (2013.01); *B60K 35/00* (2013.01); *B60W 2420/42* (2013.01)

(58) Field of Classification Search
CPC .................... B60W 30/146; B60W 35/00
See application file for complete search history.

(56) References Cited

U.S. PATENT DOCUMENTS

| | | | |
|---|---|---|---|
| 8,700,299 B2 | 4/2014 | Morita et al. | |
| 8,983,750 B2 | 3/2015 | Maruyama | |
| 2012/0046855 A1* | 2/2012 | Wey | G08G 1/09623 701/117 |
| 2012/0223845 A1* | 9/2012 | Schumann | B60K 35/00 340/995.19 |
| 2016/0214608 A1* | 7/2016 | Packwood-Ace | B60W 30/14 |
| 2017/0072952 A1* | 3/2017 | Sim | B60W 30/146 |

FOREIGN PATENT DOCUMENTS

| | | |
|---|---|---|
| DE | 10 2010 039 634 B4 | 5/2013 |
| JP | 2005-128790 A | 5/2005 |
| JP | 2006-168593 A | 6/2006 |
| JP | 2012-248111 A | 12/2012 |

* cited by examiner

Primary Examiner — Jess Whittington
(74) Attorney, Agent, or Firm — Oliff PLC

(57) ABSTRACT

A control system for a vehicle includes an imaging device; a co-ECU to limit the travel speed of the vehicle; and an ECU to set the speed limit, that recognizes the speed limit value on a road while traveling, and sets the recognized speed limit value in the co-ECU. If the elapsed time since the speed limit value has been set reaches a predetermined time, the ECU estimates the speed limit value on the road while traveling, and if receiving a switch command, switches the speed limit value set in the co-ECU to the estimated speed limit value so as to avoid limiting the vehicle speed by a speed limit value that is different from the actual speed limit value on the road.

5 Claims, 22 Drawing Sheets

| ESTIMATED INFO | WEIGHT INFO |
|---|---|
| 1ST ESTIMATED SPEED LIMIT VALUE | 3 |
| 2ND ESTIMATED SPEED LIMIT VALUE | 2 |
| 3RD ESTIMATED SPEED LIMIT VALUE | 2 |
| 4TH ESTIMATED SPEED LIMIT VALUE | 5 |
| 1ST VEHICLE SPEED RANGE SETTING | −2 |
| 2ND VEHICLE SPEED RANGE SETTING | −3 |
| 3RD VEHICLE SPEED RANGE SETTING | −1 |

FIG.5C

| ESTIMATED INFO | OUTPUT INFO | | | |
| --- | --- | --- | --- | --- |
| | SCENE 1 | SCENE 2 | SCENE 3 | SCENE 4 |
| 1ST ESTIMATED SPEED LIMIT VALUE | 60 km/h | 60 km/h | 80 km/h | 60 km/h |
| 2ND ESTIMATED SPEED LIMIT VALUE | 40 km/h | 60 km/h | 60 km/h | 80 km/h |
| 3RD ESTIMATED SPEED LIMIT VALUE | NOT OBTAINED | NOT OBTAINED | 40 km/h | NOT OBTAINED |
| 4TH ESTIMATED SPEED LIMIT VALUE | 60 km/h | 80 km/h | 60 km/h | NOT OBTAINED |
| 1ST VEHICLE SPEED RANGE SETTING | 30 to 60 km/h | 60 to 80 km/h | 50 to 80 km/h | 30 to 50 km/h |
| 2ND VEHICLE SPEED RANGE SETTING | 40 to 60 km/h | 60 to 80 km/h | 50 to 80 km/h | 50 to 80 km/h |
| 3RD VEHICLE SPEED RANGE SETTING | 50 to 60 km/h | 60 to 80 km/h | 50 to 80 km/h | 30 to 50 km/h |

| RELIABILITY | DISPLAY SETTINGS | | | |
|---|---|---|---|---|
| | DISPLAY COLOR | REVERSAL | LINE TYPE | DISPLAY CONTENTS |
| HIGH | WHITE | NO | SOLID LINE | SPEED LIMIT VALUE BASED ON ROAD SIGN |
| MIDDLE | GREEN | YES | SOLID LINE | SETTING CANDIDATE OF SPEED LIMIT VALUE CONFIRMED BY DRIVER |
| LOW | ORANGE | NO | DASHED LINE | SETTING CANDIDATE OF SPEED LIMIT VALUE SELECTED BY DRIVER |
| NO | WHITE | NO | SOLID LINE | "WAIT" |

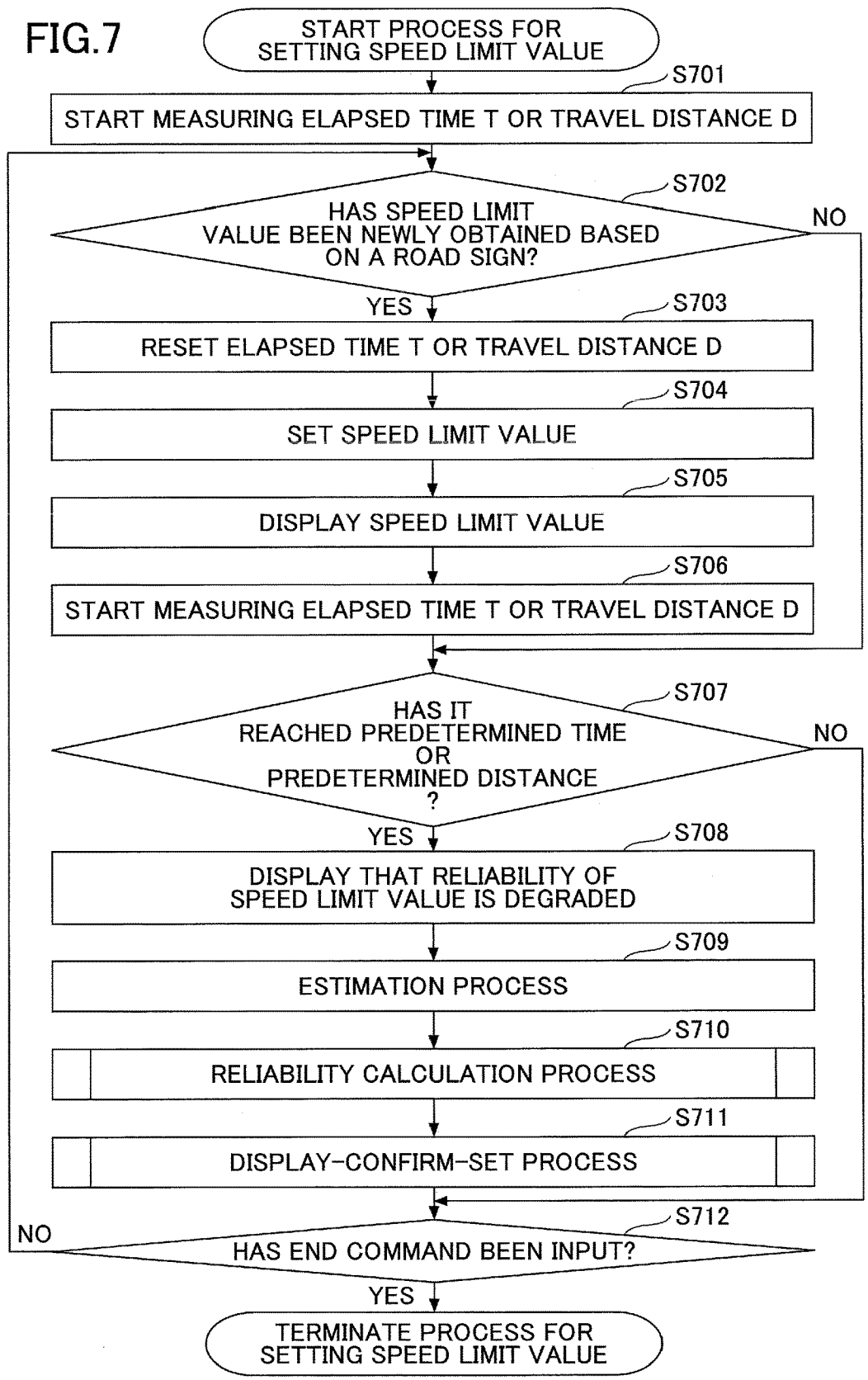

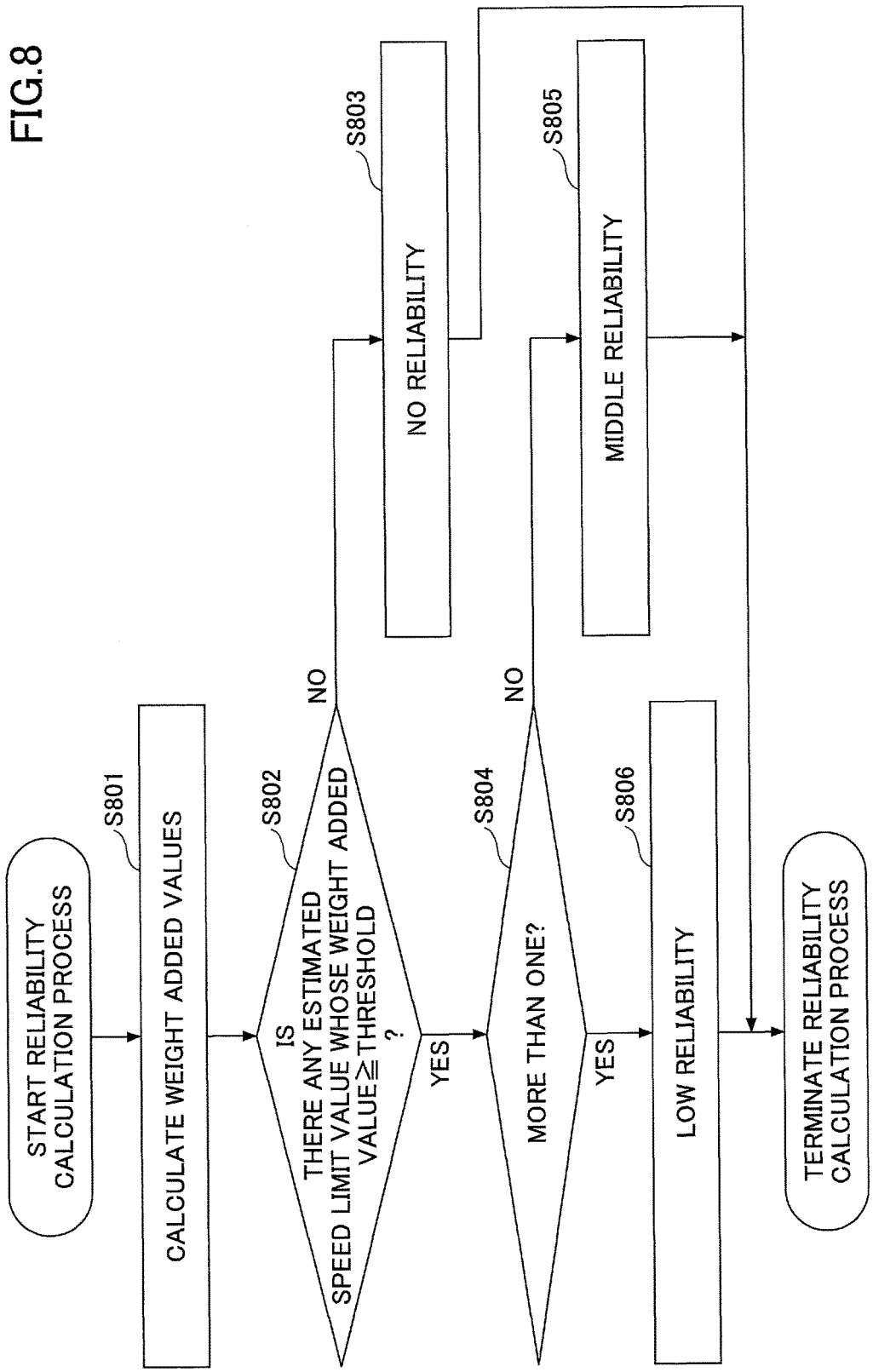

CONTROL SYSTEM FOR VEHICLE

FIELD

The following disclosure generally relates to a control system for a vehicle.

BACKGROUND

A control system for a vehicle has been known that identifies road signs and the like that represent the speed limit values on a road on which the vehicle is traveling, by using image information captured by an imaging device installed in the vehicle, recognizes the speed limit value, and limits the speed of the vehicle (see, for example, Japanese Laid-open Patent Publication No. 2005-128790).

By using the control system for a vehicle, road signs and the like located at positions on the road can be captured while the vehicle is traveling, and based on the speed limit values at the respective positions on the road, the vehicle speed can be limited.

However, if the condition of capturing an image is inadequate, such a control system for a vehicle may fail in recognizing a speed limit value that should be recognized from the captured image information. Especially, if inadequate capturing conditions are repeated, a state continues in that the speed limit value cannot be recognized even if the vehicle travels for a certain distance. In this case, the control system for a vehicle executes limiting the speed of the vehicle, by using a speed limit value that has been recognized before the state where the inadequate capturing conditions are repeated, and there is a likelihood that the speed limit value currently referred to by the system may be different from the actual speed limit value on the road on which the vehicle is traveling now.

In contrast to this, another technology has been known that estimates the speed limit value on a road, based on information other than road signs and the like (e.g., information provided by a navigation device). By using this technology, it is possible to estimate the speed limit value on a road even if the speed limit value cannot be recognized based on captured image information, and hence, it is possible to execute limiting the speed of the vehicle, by switching to the estimated speed limit value.

However, a speed limit value estimated based on information provided by a navigation device may not be always equivalent to the speed limit value on the road while traveling. This is because if the information stored in the navigation device is not the latest information, a speed limit value may be estimated that is different from the actual speed limit value on the road.

Therefore, if a system is configured to execute switching to the estimated speed limit value upon a failure in recognizing the speed limit value based on the captured image information, there is a likelihood that the speed limit value currently referred to by the system may be different from the actual speed limit value on the road on which the vehicle is traveling now.

Thereupon, it is an object of the disclosure to provide a control system for a vehicle to execute limiting the speed of the vehicle, that can avoid limiting the speed limit by a speed limit value that is different from the actual speed limit value on the road.

SUMMARY

According to an aspect of the disclosure, a control system for a vehicle includes an imaging unit configured to capture an image of a sign that represents a speed limit value on a road on which the vehicle is traveling; a recognition unit configured to obtain information about the image captured by the imaging unit, and to recognize the speed limit value; a setting unit configured to set the speed limit value recognized by the recognition unit; a limiter unit configured to limit a vehicle speed of the vehicle, based on the speed limit value set by the setting unit; a measurement unit configured to measure at least one of an elapsed time and a travel distance, since the speed limit value recognized by the recognition unit has been set by the setting unit; an estimation unit configured to estimate the speed limit value on the road on which the vehicle is traveling in at least one of a case where the elapsed time measured by the measurement unit has reached a predetermined time, and a case where the travel distance measured by the measurement unit has reached a predetermined distance; a display unit configured to display the speed limit value estimated by the estimation unit on a display device before switching the speed limit value set by the setting unit to the speed limit value estimated by the estimation unit; and a command determination unit configured, when the speed limit value estimated by the estimation unit is displayed on the display device, to determine whether a switching command to switch to the speed limit value estimated by the estimation unit has been input. If the command determination unit determines that the switching command has been input, the speed limit value set by the setting unit is switched to the speed limit value estimated by the estimation unit.

In this way, the control system for a vehicle measures the elapsed time or the travel distance since a speed limit value was set based on recognized image information, and when a predetermined time has passed or when a predetermined distance has been covered, displays a speed limit value estimated by the estimation unit.

Thus, the driver of the vehicle can grasp that the likelihood is high that the control system for a vehicle has failed in recognizing a speed limit value that should be recognized, and now executes limiting the speed by a speed limit value different from the speed limit value on a road on which the vehicle is traveling now. Consequently, the driver of the vehicle may switch the speed limit value, with which it is possible to avoid limiting the speed limit by the speed limit value that is different from the actual speed limit value on the road.

Also, the control system for a vehicle determines whether a switching command has been entered when displaying a speed limit value estimated by the estimation unit, and if determining that the switching command has been entered, switches to the speed limit value estimated by the estimation unit.

Thus, the driver of the vehicle can see the estimated speed limit value to determine whether it is an appropriate speed limit value, and if appropriate, to perform the switching. Consequently, it is possible to avoid limiting the speed limit by the speed limit value that is different from the actual speed limit value on the road.

According to the disclosure, it is possible to provide a control system for a vehicle that executes limiting the speed of the vehicle, and can avoid limiting the speed limit by a speed limit value that is different from the actual speed limit value on the road.

BRIEF DESCRIPTION OF DRAWINGS

FIGS. 5A-5C are diagrams that illustrate an example of a functional configuration of a reliability determination unit and reliability information;

FIGS. 6A-6B are diagrams that illustrate an example of a functional configuration of a display control unit and display setting information;

FIG. 7 is a flowchart that illustrates a flow of a process for setting the speed limit value by a speed limit setting unit;

FIG. 8 is a flowchart that illustrates a flow of a reliability calculation process by a reliability determination unit;

DESCRIPTION OF EMBODIMENTS

In the following, embodiments will be described with reference to the drawings. Note that the reliability of a speed limit value to be set as the upper limit speed value to limit the speed of vehicle is assumed as follows. First, a speed limit value based on a road sign, a road surface display or the like (representatively referred to as a "road sign" below) comes from an information source whose reliability is high. Next, a speed limit value estimated based on information other than a road sign (an estimated speed limit value) comes from an information source whose reliability is middle or low. In addition, when the upper limit speed value to be set is switched from a speed limit value based on a road sign, to an estimated speed limit value estimated based on information other than a road sign (namely, a speed limit value having an inferior reliability), it is expressed as "the reliability of the speed limit value is degraded."

Also, even for a speed limit value based on a road sign, which is assumed to be highly reliable, the reliability may be differentiated between a timing just after the speed limit value is obtained, and a timing after a predetermined time has passed (or a predetermined distance has been covered by traveling). Thereupon, when the time has passed since a speed limit value based on a road sign has been obtained (or the travel distance has been accumulated), it is expressed as "the reliability of the speed limit value goes in the degrading direction."

In the following, embodiments will be described using these expressions. Also note that throughout the specification and the drawings, elements that have substantially the same functions and configurations are assigned the same codes, and duplicated description will be omitted.

<1. Configuration of Setting Control System>

Figure 1:
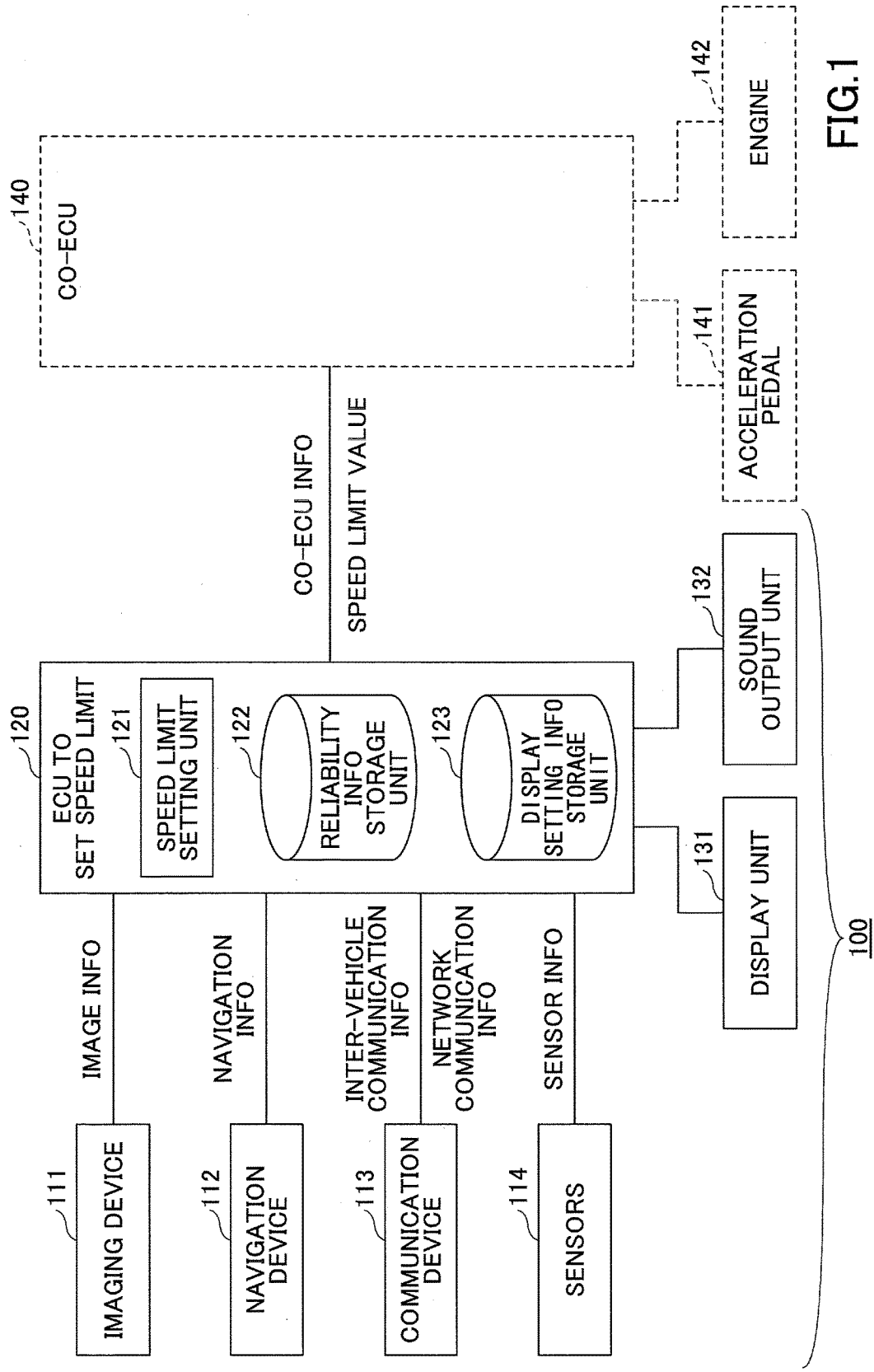
FIG. 1 is a diagram that illustrates an example of a setting control system.

First, a configuration of a setting control system will be described that sets an upper limit speed value to limit the vehicle speed. FIG. 1 is a diagram that illustrates an example of a setting control system 100. As illustrated in FIG. 1, the setting control system 100 includes an imaging device 111, a navigation device 112, a communication device 113, and a sensor 114. The setting control system 100 also includes an ECU (Electronic Control Unit) to set the speed limit 120 as an example of a control device, a display unit 131, and a sound output unit 132. Note that the setting control system 100 in the embodiments constitutes a control system for the vehicle that has the setting control system 100 connected with a co-ECU 140 connected with an acceleration pedal 141, an engine 142, and the like.

The imaging device 111 captures an image of a road sign that represents the speed limit value on a road on which the vehicle is traveling, and transmits the captured image information to the ECU to set the speed limit 120. The navigation device 112 identifies the position of the vehicle while traveling, and transmits information about the speed limit value on a road on which the vehicle is traveling, which has been stored in it in advance, to the ECU to set the speed limit 120 as navigation information.

The communication device 113 obtains speed limit values set on other vehicles by communicating with the other vehicles, and transmits them to the ECU to set the speed limit 120 as inter-vehicle communication information. Also, the communication device 113 connects to a network such as the Internet to obtain information about the speed limit value on a road on which the vehicle is traveling, and to obtain neighboring environment information of a road on which the vehicle is traveling, such as a road shape, a road state, weather, and the like. Furthermore, the communication device 113 connects to the network such as the Internet to obtain information about a travel scene that includes a state of traffic congestion, breaking-in, passing, and the like on a road on which the vehicle is traveling now. Note that the communication device 113 transmits these information items obtained by connecting to the network, to the ECU to set the speed limit 120 as network communication information.

The sensor 114 detects the traveling speed of a neighboring vehicle. The sensor 114 transmits the detected traveling speed of the neighboring vehicle to the ECU to set the speed limit 120 as sensor information.

The ECU to set the speed limit 120 derives a speed limit value (a speed limit value based on a road sign or an estimated speed limit value estimated based on information other than a road sign), and sets the derived speed limit value in the co-ECU 140 as the upper limit speed value. This function of the ECU to set the speed limit 120 is implemented by executing a speed limit setting program that makes the ECU to set the speed limit 120 function as the speed limit setting unit 121.

Note that reliability information and display setting information that are used when executing the speed limit setting program, are stored in a reliability information storage unit 122 and a display setting information storage unit 123, respectively, in the ECU to set the speed limit 120.

The display unit 131 displays a speed limit value set in the co-ECU 140 as the upper limit speed value on a speed limit display screen. Also, when a speed limit value set in the co-ECU 140 as the upper limit speed value is switched to another speed limit value having an inferior reliability, the display unit 131 displays a confirmation display screen to have the driver confirm it. Furthermore, the display unit 131 transmits a command input by the driver on the confirmation display screen to the ECU to set the speed limit 120.

The sound output unit 132 outputs a message output from the ECU to set the speed limit 120 by sound.

The co-ECU 140 is a limiter unit that controls the engine 142 to limit the vehicle speed, based on the speed limit value set by the ECU to set the speed limit 120 as the upper limit speed value, output of the acceleration pedal 141, and the like. Also, in addition to limiting the vehicle speed, the co-ECU 140 transmits the current vehicle speed, history information of speed limit values that were set when the vehicle traveled on the road in the past, and the like as co-ECU information, to the ECU to set the speed limit 120.

Note that the example in FIG. 1 is configured to have the imaging device 111, the navigation device 112, the communication device 113, and the sensor 114 connected with the ECU to set the speed limit 120, to input various information items from these devices into the ECU to set the speed limit 120. However, these devices may be connected with the co-ECU 140 to input various information items from these devices into the ECU to set the speed limit 120 via the co-ECU 140.

Also, in the example in FIG. 1, the ECU to set the speed limit 120 is provided as an ECU separate from the co-ECU 140. However, functions implemented by the ECU to set the speed limit 120 may be implemented, for example, on the co-ECU 140.

<2. Hardware Configuration of ECU for Setting the Speed Limit>

Figure 2:
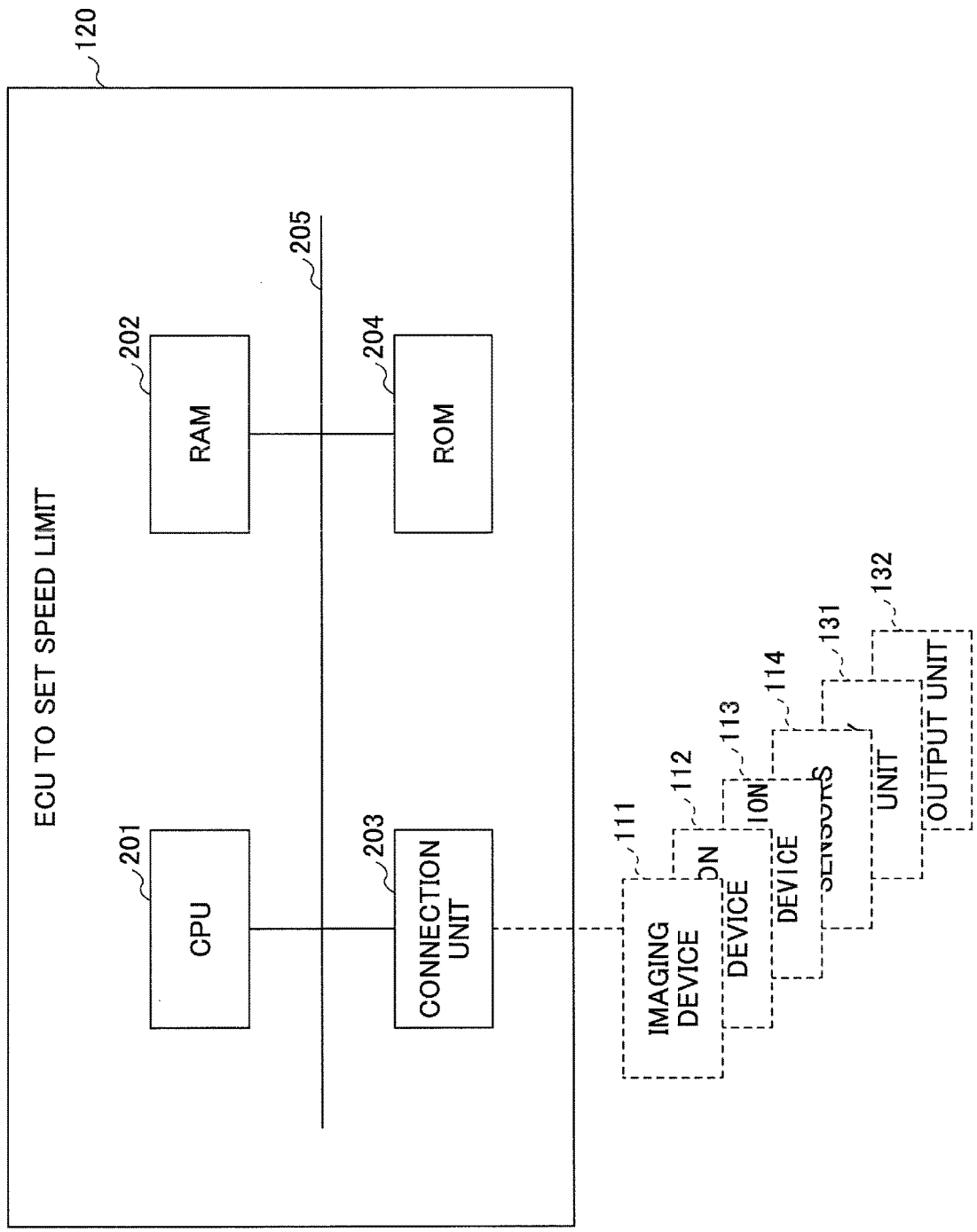
FIG. 2 is a diagram that illustrates an example of a hardware configuration of an ECU to set the speed limit.

Next, a hardware configuration of the ECU to set the speed limit 120 will be described. FIG. 2 is a diagram that illustrates an example of a hardware configuration of the ECU to set the speed limit 120.

As illustrated in FIG. 2, the ECU to set the speed limit 120 includes a CPU (Central Processing Unit) 201, a RAM (Random Access Memory) 202, a connection unit 203, and a ROM (Read-Only Memory) 204. Note that these units of the ECU to set the speed limit 120 are mutually connected via a bus 205.

The CPU 201 is a computer that executes programs (the speed limit setting program and the like) stored in the ROM 204.

The RAM 202 is a main memory unit such as a DRAM (Dynamic Random Access Memory) and a SRAM (Static Random Access Memory). The RAM 202 functions as a work area in which a program stored in the ROM 204 is loaded and executed by the CPU 201. The RAM 202 also functions as a storage area in which information is temporarily stored that is generated by a program stored in the ROM 204, and executed by the CPU 201.

The connection unit 203 is connected with and various devices such as the imaging device 111 and the navigation device 112, and serves as an interface to transmit/receive information to/from the various devices.

The ROM 204 is a main memory unit such as an EPROM and an EEPROM, and stores the programs (the speed limit setting program and the like) executed by the CPU 201, and information that is used when the programs are executed (e.g., the reliability information and the display setting information).

<3. Functional Configuration of ECU to Set the Speed Limit>

Figure 3:
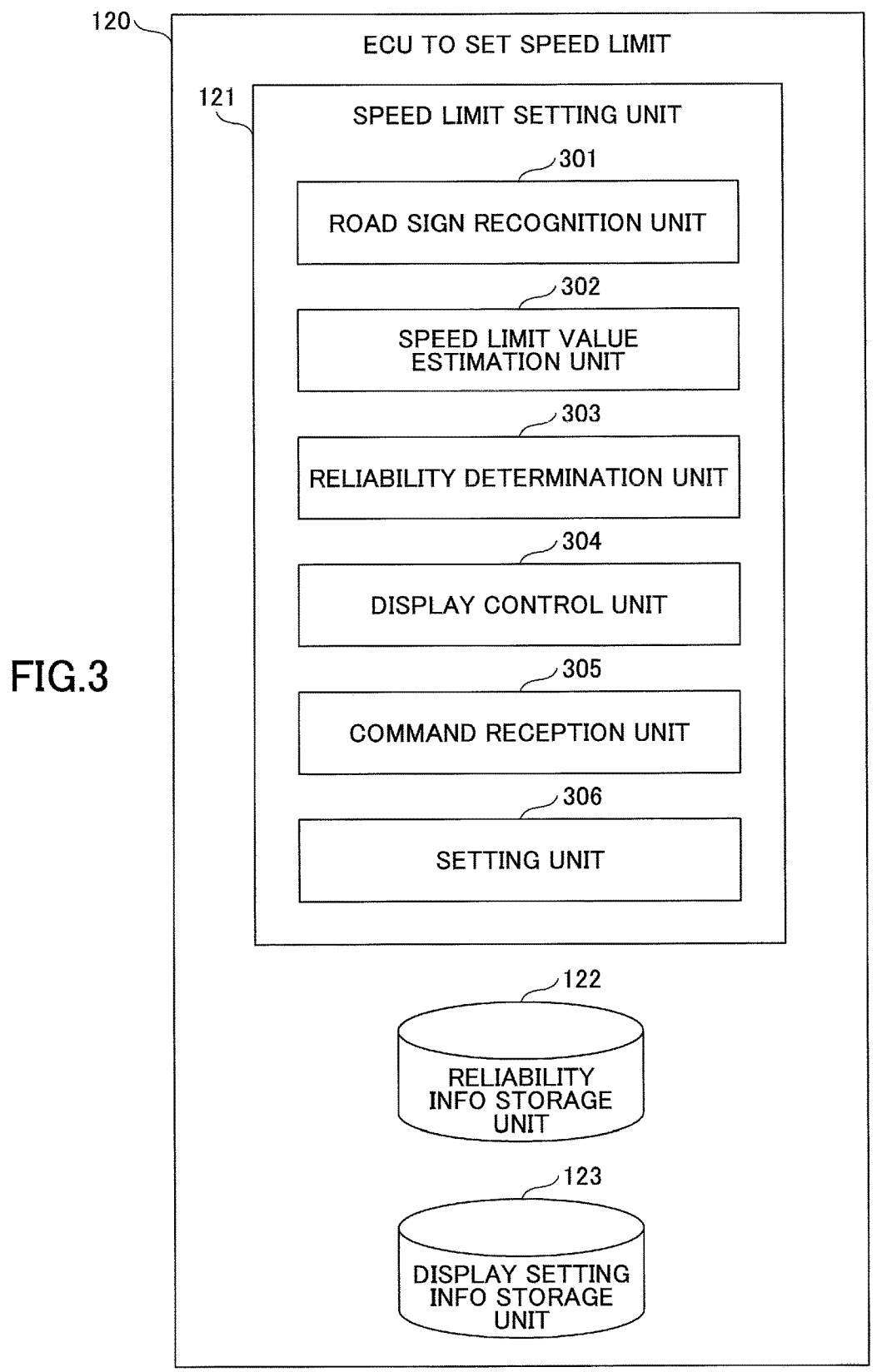
FIG. 3 is a diagram that illustrates a functional configuration of the ECU to set the speed limit.

Next, functional units of the ECU to set the speed limit 120 that collectively function as the speed limit setting unit 121 will be described. FIG. 3 is a diagram that illustrates a functional configuration of the ECU to set the speed limit 120. As illustrated in FIG. 3, the speed limit setting unit 121 includes a road sign recognition unit 301, a speed limit value estimation unit 302, a reliability determination unit 303, a display control unit 304, a command reception unit 305, and a setting unit 306.

The road sign recognition unit 301 obtains a speed limit value based on a road sign, by recognizing the road sign that shows the speed limit value in image information captured by the imaging device 111.

The speed limit value estimation unit 302 calculates an estimated speed limit value and the like, based on the navigation information transmitted from the navigation device 112, the inter-vehicle communication information and the network communication information transmitted from the communication device 113, the sensor information transmitted from the sensor 114, and the like.

The reliability determination unit 303 calculates the reliability of the estimated speed limit value calculated by the speed limit value estimation unit 302, based on the reliability information stored in the reliability information storage unit 122. Also, based on the calculated reliability, the reliability determination unit 303 determines an estimated speed limit value to be confirmed by the driver among the estimated speed limit values calculated by the speed limit value estimation unit 302, as a "setting candidate of the speed limit value".

The display control unit 304 displays the setting candidate of the speed limit value determined in the reliability determination unit 303 on the display unit 131 via a confirmation display screen. The display control unit 304 also displays a speed limit value set in the co-ECU 140 as the upper limit speed value on the display unit 131 via the confirmation display screen. Note that the display control unit 304 controls displaying the speed limit value as the upper limit speed value on the display unit 131, based on the display setting information stored in the display setting information storage unit 123.

The command reception unit 305 receives a command input by the driver through the confirmation display screen displayed on the display unit 131, and indicates contents of the command to the setting unit 306.

The setting unit 306 sets a speed limit value that corresponds to the contents of the command indicated by the command reception unit 305, in the co-ECU 140 as the upper limit speed value.

<4. Functional Configuration of Speed Limit Value Estimation Unit>

Figure 4:
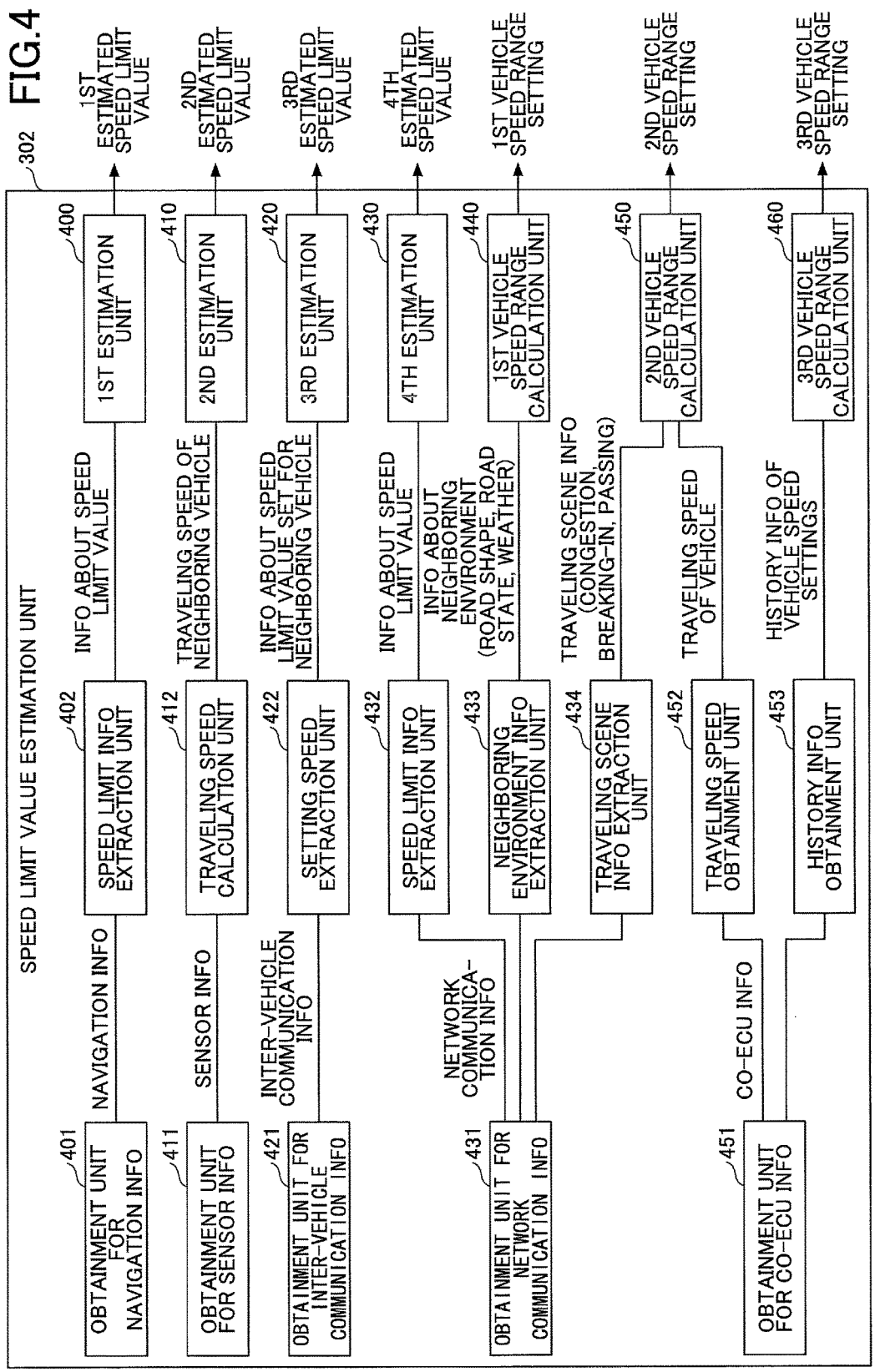
FIG. 4 is a diagram that illustrates an example of a functional configuration of a speed limit value estimation unit.

Next, a detailed functional configuration of the speed limit value estimation unit 302 included in the speed limit setting unit 121 will be further described using FIG. 4. FIG. 4 is a diagram that illustrates an example of a detailed functional configuration of the speed limit value estimation unit 302.

As illustrated in FIG. 4, the speed limit value estimation unit 302 includes multiple estimation units (a first estimation unit 400, a second estimation unit 410, a third estimation unit 420, and a fourth estimation unit 430). The speed limit value estimation unit 302 also includes multiple vehicle speed range calculation units (a first vehicle speed range calculation unit 440, a second vehicle speed range calculation unit 450, and a third vehicle speed range calculation unit 460).

The first estimation unit 400 receives information about the speed limit value extracted by a speed limit information extraction unit 402 from the navigation information obtained from the navigation device 112 by an obtainment unit for navigation information 401. The navigation information includes information about the speed limit value on a road on which the vehicle is traveling now, and the speed limit information extraction unit 402 can extract the information about the speed limit value from the navigation information. The first estimation unit 400 outputs the information about the speed limit value indicated by the speed limit information extraction unit 402 as a first estimated speed limit value.

The second estimation unit 410 receives the traveling speed of a neighboring vehicle calculated by a traveling speed calculation unit 412 based on the sensor information obtained from the sensor 114 by an obtainment unit for sensor information 411. The second estimation unit 410 estimates the speed limit value on a road on which the vehicle is traveling based on the traveling speed of the neighboring vehicle, and outputs it as a second estimated speed limit value (estimates the second estimated speed limit value, for example, by calculating a value obtained by multiplying the traveling speed of the neighboring vehicle by a predetermined coefficient).

The third estimation unit 420 receives information about the speed limit value set on the neighboring vehicle extracted by a setting speed extraction unit 422 based on the inter-vehicle communication information obtained from the communication device 113 by an obtainment unit for inter-vehicle communication information 421. The third estimation unit 420 outputs the information about the speed limit value indicated by the setting speed extraction unit 422 as a third estimated speed limit value.

The fourth estimation unit 430 receives, as input, information about the speed limit value extracted by a speed limit information extraction unit 432 based on the network communication information obtained from the communication device 113 by an obtainment unit for network communication information 431. The network communication information includes information about the speed limit value on a road on which the vehicle is traveling now, and the speed limit information extraction unit 432 can extract the information about the speed limit value from the network communication information. The fourth estimation unit 430 outputs the information about the speed limit value indicated by the speed limit information extraction unit 432 as a fourth estimated speed limit value.

The first vehicle speed range calculation unit 440 receives the neighboring environment information extracted by a neighboring environment information extraction unit 433 from the network communication information obtained from the communication device 113 by the obtainment unit for network communication information 431. The neighboring environment information includes the road shape, road states by time zones of a road on which the vehicle is traveling now, and weather at the position of the vehicle while traveling. The first vehicle speed range calculation unit 440 calculates and outputs a range of the traveling speed that can be assumed based on the neighboring environment information indicated by the neighboring environment information extraction unit 433, as a first vehicle speed range setting.

The second vehicle speed range calculation unit 450 receives travel scene information extracted by a traveling scene information extraction unit 434 from the network communication information obtained from the communication device 113 by the obtainment unit for network communication information 431. Also, the second vehicle speed range calculation unit 450 also receives the current traveling speed of the vehicle obtained by a traveling speed obtainment unit 452 from the co-ECU information obtained from the co-ECU 140 by an obtainment unit for co-ECU information 451.

The second vehicle speed range calculation unit 450 calculates and outputs a range of the traveling speed that can be assumed based on information included in the travel scene information that represents a traveling state of the vehicle with respect to neighboring vehicles, such as traffic congestion, breaking-in, and passing, and the traveling speed of the vehicle itself.

The third vehicle speed range calculation unit 460 receives speed limit values set in the past on a road on which the vehicle is traveling now obtained by a history information obtainment unit 453 from the co-ECU information obtained from the co-ECU 140 by the obtainment unit for co-ECU information 451, as history information about vehicle speed settings. The third vehicle speed range calculation unit 460 calculates and outputs a range of the traveling speed that can be assumed, based on the history information about vehicle speed settings indicated by the history information obtainment unit 453.

<5. Functional Configuration of Reliability Determination Unit and Description of Reliability Information>

Next, a functional configuration of the reliability determination unit 303 and the reliability information stored in the reliability information storage unit 122 will be described in detail using FIGS. 5A-5C.

Figures 5A, 5B:
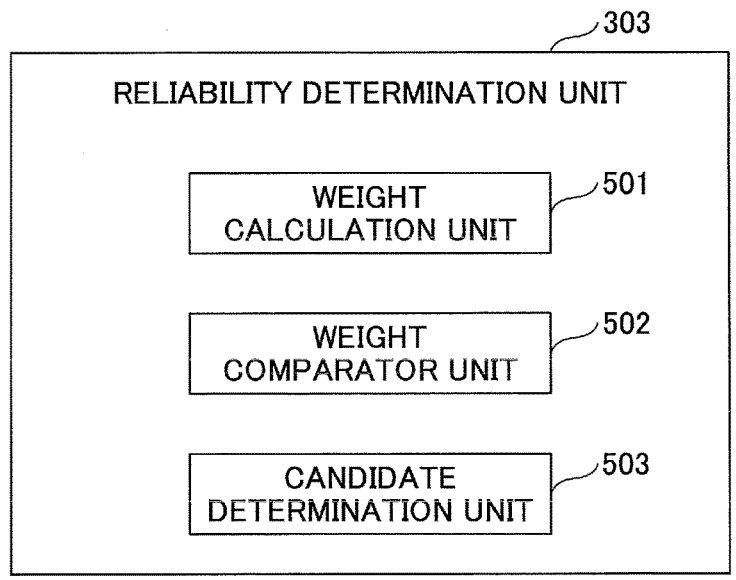

FIG. 5A is a diagram that illustrates an example of a functional configuration of the reliability determination unit 303. As illustrated in FIG. 5A, the reliability determination unit 303 includes a weight calculation unit 501, a weight comparator unit 502, and a candidate determination unit 503.

The weight calculation unit 501 obtains the first to fourth estimated speed limit values and the first to third vehicle speed range settings output by the speed limit value estimation unit 302. Also, the weight calculation unit 501 obtains weight information that corresponds to the obtained first to fourth estimated speed limit values and the obtained first to third vehicle speed range settings from the reliability information storage unit 122.

Furthermore, the weight calculation unit 501 adds the weight information to those among the first to fourth estimated speed limit values representing the same estimated speed limit values, to calculate the weight added values for the respective estimated speed limit values. Note that if the estimated speed limit values are not included in the first to third vehicle speed range settings, respectively, weight information of the corresponding vehicle speed range setting is further added.

The weight comparator unit 502 compares the weight added value of each of the estimated speed limit values calculated in the weight calculation unit 501 with a predetermined threshold. If the weight added value is greater than or equal to the predetermined threshold, the weight comparator unit 502 indicates the estimated speed limit value to the candidate determination unit 503.

If the number of estimated speed limit values indicated by the weight comparator unit 502 is one, the candidate determination unit 503 determines the estimated speed limit value as a setting candidate of the speed limit value having the middle reliability. If two or more estimated speed limit values are indicated by the weight comparator unit 502, the candidate determination unit 503 determines the estimated speed limit values as setting candidates of the speed limit value having the low reliability. Furthermore, if no estimated speed limit value is indicated by the weight comparator unit 502, the candidate determination unit 503 determines there is no reliability.

FIG. 5B is a diagram that illustrates an example of the reliability information 510 that records the weight information used by the weight calculation unit 501 of the reliability determination unit 303 when calculating the weight added value. Note that the reliability information 510 is stored in the reliability information storage unit 122.

As illustrated in FIG. 5B, the reliability information 510 includes information items of "estimated information" and "weight information". Fields of "estimated information" record names of information output by the first estimation unit 400 to the fourth estimation unit 430, respectively. Fields of "weight information" record the weight information items that correspond to the information output by the first estimation unit 400 to the fourth estimation unit 430, respectively.

According to the example in FIG. 5B, the weight information of the "first estimated speed limit value" output by the first estimation unit 400 is "3", and the weight information of the "second estimated speed limit value" output by the second estimation unit 410 is "2". Also, the weight information of the "third estimated speed limit value" output by the third estimation unit 420 is "2", and the weight information of the "fourth estimated speed limit value" output by the fourth estimation unit 430 is "5".

Furthermore, the weight information items of the first to third vehicle speed range settings output by the first to third vehicle speed range calculation units 440, 450 and 460 are "−2", "−3", and "−1", respectively.

FIG. 5C is a diagram that illustrates a specific example of the first to fourth estimated speed limit values and the first to third vehicle speed range settings output by the speed limit value estimation unit 302. Using the specific example illustrated in FIG. 5C, operations of the reliability determination unit 303 will be further described in detail.

In a case of "scene 1", the weight calculation unit 501 obtains the first estimated speed limit value "60 km/h", the second estimated speed limit value "40 km/h", and the fourth estimated speed limit value "60 km/h", and obtains the respective weight information items of "3", "2", and "5". Furthermore, the weight calculation unit 501 calculates the weight added values of the estimated speed limit values as follows, respectively:

the weight added value of the estimated speed limit value "60 km/h" is 3+5=8; and the weight added value of the estimated speed limit value "40 km/h" is 2.

Note that the estimated speed limit value "60 km/h" is included in all the first to third vehicle speed range settings, and hence, the weight information items that correspond the first to third vehicle speed range settings are not added to the weight added value for "60 km/h", respectively.

On the other hand, the estimated speed limit value "40 km/h" is not included in the third vehicle speed range setting, and hence, the weight information "−1" that corresponds to the third vehicle speed range setting is added to the weight added value for "40 km/h". Consequently, the weight added value for "40 km/h" is calculated eventually as follows:

the weight added value of the estimated speed limit value "40 km/h" is 2+(−1)=1.

The weight comparator unit 502 compares the weight added value of "60 km/h" and the weight added value of "40 km/h", with a predetermined threshold (e.g., "4"), respectively. Here, since the weight added value of "60 km/h" is "8", the weight comparator unit 502 determines that it is greater than or equal to the predetermined threshold. Also, since the weight added value of "40 km/h" is "1", the weight comparator unit 502 determines that it is less than the predetermined threshold. Thus, the weight comparator unit 502 indicates the estimated speed limit value "60 km/h" to the candidate determination unit 503.

Having received from the weight comparator unit 502 only one estimated speed limit value of "60 km/h", the candidate determination unit 503 determines the estimated speed limit value as the setting candidate of the speed limit value having the middle reliability.

In a case of "scene 2", the weight added value of the estimated speed limit value "60 km/h" is 3+2=5;

the weight added value of the estimated speed limit value "80 km/h" is 5;

and the candidate determination unit 503 receives the estimated speed limit value "60 km/h" and the estimated speed limit value "80 km/h". Therefore, the candidate determination unit 503 determines that these estimated speed limit values as setting candidates of the speed limit value having the low reliability.

In a case of "scene 3", the weight added value of the estimated speed limit value "80 km/h" is 3;

the weight added value of the estimated speed limit value "60 km/h" is 2+5=7;

the weight added value of the estimated speed limit value "40 km/h" is 2+(−2)+(−3)+(−1)=−4; and the candidate determination unit 503 receives the estimated speed limit value "60 km/h". Therefore, the candidate determination unit 503 determines the estimated speed limit value as the setting candidate of the speed limit value having the middle reliability.

Furthermore, in a case of "scene 4", the weight added value of the estimated speed limit value "60 km/h" is 3+(−2)+(−1)=0;

the weight added value of the estimated speed limit value "80 km/h" is 2+(−2)+(−1)=−1;

and the candidate determination unit 503 receives no indication. Therefore, the candidate determination unit 503 determines that there is no reliability, and determines that no setting candidate of the speed limit value is available.

In this way, the reliability determination unit 303 indicates a setting candidate(s) of the speed limit value and the reliability to the display control unit 304.

<6. Functional Configuration of Display Control Unit and Description of Display Setting Information>

Next, a functional configuration of the display control unit 304, and the display setting information stored in the display setting information storage unit 123 will be described in detail using FIGS. 6A-6B.

Figure 6A:
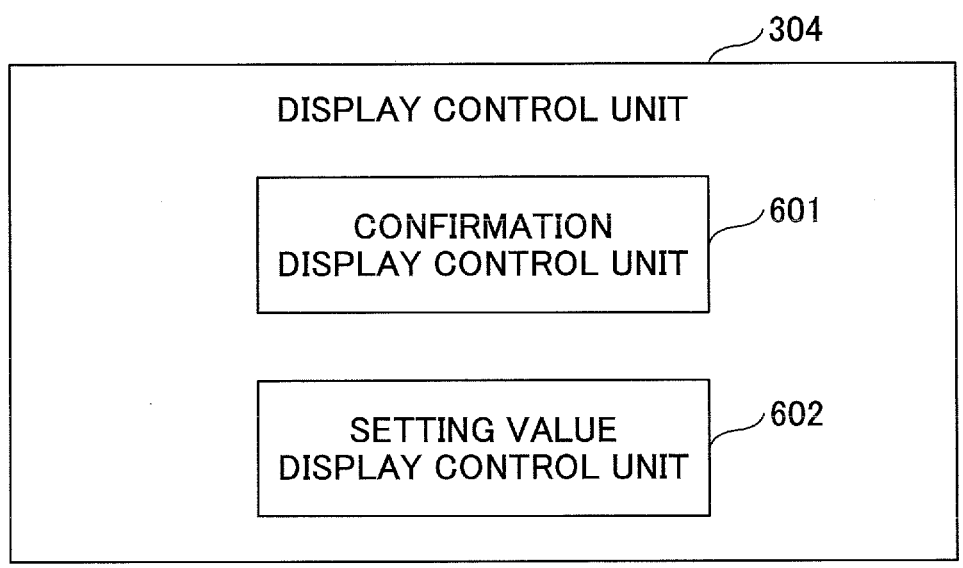

FIG. 6A is a diagram that illustrates an example of a functional configuration of the display control unit 304. As illustrated in FIG. 6A, the display control unit 304 includes a confirmation display control unit 601 and a setting value display control unit 602.

The confirmation display control unit 601 displays a confirmation display screen when a setting candidate of the speed limit value is indicated by the reliability determination unit 303, to have the driver confirm that the speed limit value currently set will be switched to the indicated setting candidate of the speed limit value.

Specifically, if a setting candidate of the speed limit value having the middle reliability is indicated by the reliability determination unit 303, the confirmation display control unit 601 displays a confirmation display screen to have the driver confirm that the speed limit value currently set will be switched to the indicated setting candidate of the speed limit value.

If multiple setting candidates of the speed limit value having the low reliability are indicated by the reliability determination unit 303, the confirmation display control unit 601 displays a confirmation display screen to have the driver select one of the setting candidates of the speed limit value.

Note that if the no reliability is indicated by the reliability determination unit 303, the confirmation display control unit 601 indicates that there is no estimated speed limit value to the setting value display control unit 602, without displaying a confirmation display screen.

The setting value display control unit 602 displays the speed limit value to be set in the co-ECU 140 as the upper limit speed value, on the speed limit display screen, following the display setting information stored in the display setting information storage unit 123.

FIG. 6B is a diagram that illustrates an example of the display setting information 600 stored in the display setting information storage unit 123. As illustrated in FIG. 6B, information items of display setting information 600 include "reliability" and "display settings", and "display settings" further include "display color", "reversal", "line type", and "display contents".

The item "reliability" records classification of the reliability of a setting candidate of the speed limit value determined by the reliability determination unit 303. The items "display color", "reversal", "line type", and "display contents" record a method of displaying and display contents specified for the reliability.

According to the example in the display setting information 600, if the reliability is "high", a speed limit value based on a road sign is displayed by white, solid-line characters on the speed limit display screen. If the reliability is middle, a setting candidate of the speed limit value confirmed by the driver on a confirmation display screen is displayed by green, reverse, solid-line characters on the speed limit display screen. If the reliability is low, a setting candidate of the speed limit value selected by the, driver among multiple setting candidates of the speed limit value displayed on a confirmation display screen is displayed by orange, dashed-line characters on the speed limit display screen.

Further, if there is no reliability, a message "wait" is displayed by white, solid-line characters on the speed limit display screen.

<7. Flow of Process for Setting the Speed Limit Value>

Next, a flow of a process for setting the speed limit value by the speed limit setting unit 121 will be described. FIG. 7 is a flowchart that illustrates the flow of the process for setting the speed limit value by the speed limit setting unit 121.

Once the ECU to set the speed limit 120 is activated, the speed limit setting unit 121 starts the process for setting the speed limit value. At Step S701, the road sign recognition unit 301 of the speed limit setting unit 121 starts measuring the elapsed time T or the travel distance D that has passed since a speed limit value based on a road sign has been obtained. Note that it is assumed in the embodiment that the speed limit value based on a road sign has been obtained when the process for setting the speed limit value is started, and the speed limit value is displayed on the speed limit display screen.

At Step S702, the road sign recognition unit 301 analyzes image information transmitted from the imaging device 111, and then, determines whether a speed limit value has been newly obtained based on the road sign.

At Step S702, if determining that a speed limit value has not been newly obtained based on the road sign, the road sign recognition unit 301 goes forward to Step S707. At Step S707, the road sign recognition unit 301 determines whether the elapsed time T has reached a predetermined time (or whether the travel distance D has reached a predetermined distance).

At Step S707, if determining that it has not reached the predetermined time (or the predetermined distance), the road sign recognition unit 301 goes forward to Step S712. At Step S712, the road sign recognition unit 301 determines whether a command to end the process for setting the speed limit value has been input. At Step S712, if determining that the command to end has not been input, the road sign recognition unit 301 goes back to Step S702.

In this way, the road sign recognition unit 301 monitors whether a speed limit value has been newly obtained based on a road sign until the elapsed time T has reached the predetermined time (or until the travel distance D has reached the predetermined distance).

Then, at Step S702, if determining that a speed limit value has been newly obtained based on the road sign, the road sign recognition unit 301 goes forward to Step S703.

At Step S703, the road sign recognition unit 301 resets the elapsed time T or the travel distance D for the moment. At Step S704, the setting unit 306 of the speed limit setting unit 121 sets the speed limit value based on the road sign obtained by the road sign recognition unit 301, in the co-ECU 140 as the upper limit speed value.

At Step S705, the setting value display control unit 602 of the display control unit 304 displays the speed limit value set at Step S704 on the speed limit display screen by the display aspect specified for the reliability "high".

At Step S706, the road sign recognition unit 301 restarts measuring the elapsed time T or the travel distance D, and goes forward to Step S707.

In this way, the road sign recognition unit 301 resets the elapsed time T or the travel distance D every time obtaining a speed limit value based on a road sign, and overwrites the upper limit speed value set in the co-ECU 140 by the newly obtained speed limit value based on the road sign.

On the other hand, before newly obtaining a speed limit value based on a road sign, if the elapsed time T has reached the predetermined time (or the travel distance D has reached the predetermined distance), the road sign recognition unit 301 goes forward to Step S708.

At Step S708, the display control unit 304 of the speed limit setting unit 121 displays an indication that the reliability of the speed limit value is degraded. Specifically, by blinking the display of the speed limit value on the speed limit display screen, the display control unit 304 indicates to the driver that the speed limit value currently set will be switched to a speed limit value having an inferior reliability.

At Step S709, the speed limit value estimation unit 302 of the speed limit setting unit 121 calculates the first to fourth estimated speed limit values and the first to third vehicle speed range settings. At Step S710, the reliability determination unit 303 of the speed limit setting unit 121 calculates the weight added values of the estimated speed limit values, respectively, based on the first to fourth estimated speed limit values and the first to third vehicle speed range settings calculated at Step S709. Furthermore, based on the calculated weight added values, the reliability determination unit 303 determines the setting candidate of the speed limit value. Note that the reliability calculation process at Step S710 by the reliability determination unit 303 will be described in detail later.

At Step S711, the display control unit 304 displays a confirmation display screen to have the driver confirm that the speed limit value currently set will be switched to the setting candidate of the speed limit value determined at Step S710. Also, the command reception unit 305 of the speed limit setting unit 121 receives a command input by the driver on the displayed confirmation display screen. Furthermore, the setting unit 306 of the speed limit setting unit 121 sets a speed limit value depending on contents of the command received by the command reception unit 305, in the co-ECU 140 as the upper limit speed value. Note that the display-confirm-set process at Step S711 by the display control unit 304, the command reception unit 305, and the setting unit 306 will be described in detail later.

At Step S712, the road sign recognition unit 301 determines whether the command to end the process for setting the speed limit value has been input. At Step S712, if determining that the command to end has not been input, the road sign recognition unit 301 goes back to Step S702. On the other hand, if determining that the command to end has been input, the road sign recognition unit 301 ends the process for setting the speed limit value.

<8. Flow of Reliability Calculation Process>

Next, a flow of the reliability calculation process at Step S710 will be described using FIG. 8. FIG. 8 is a flowchart that illustrates the flow of the reliability calculation process by the reliability determination unit 303.

At Step S801, the weight calculation unit 501 of the reliability determination unit 303 calculates the weight added values for the estimated speed limit values, respectively, based on the reliability information 510.

At Step S802, the weight comparator unit 502 of the reliability determination unit 303 determines whether there is an estimated speed limit value greater than or equal to the predetermined threshold. At Step S802, if determining that there is no estimated speed limit value whose weight added value is greater than or equal to the predetermined threshold, the weight comparator unit 502 goes forward to Step S803. At Step S803, the candidate determination unit 503 determines that there is no reliability, and ends the reliability calculation process.

On the other hand, at Step S802, if determining that there is an estimated speed limit value whose weight added value is greater than or equal to the predetermined threshold, the weight comparator unit 502 goes forward to Step S804. At Step S804, the candidate determination unit 503 determines whether there are multiple estimated speed limit values whose weight added values are greater than or equal to the predetermined threshold.

At Step S804, if determining that there is only one estimated speed limit value whose weight added value is greater than or equal to the predetermined threshold, the weight comparator unit 502 goes forward to Step S805. At Step S805, the candidate determination unit 503 determines that the reliability is middle, determines the only one estimated speed limit value as the setting candidate of the speed limit value, and then, ends the reliability calculation process.

On the other hand, at Step S804, if determining that there are multiple estimated speed limit values whose weight added values are greater than or equal to the predetermined threshold, the weight comparator unit 502 goes forward to Step S806. At Step S806, the candidate determination unit 503 determines that the reliability is low, determines the estimated speed limit values as setting candidates of the speed limit value, and then, ends the reliability calculation process.

<9. Flow of Display-confirm-set Process>

Figure 9:
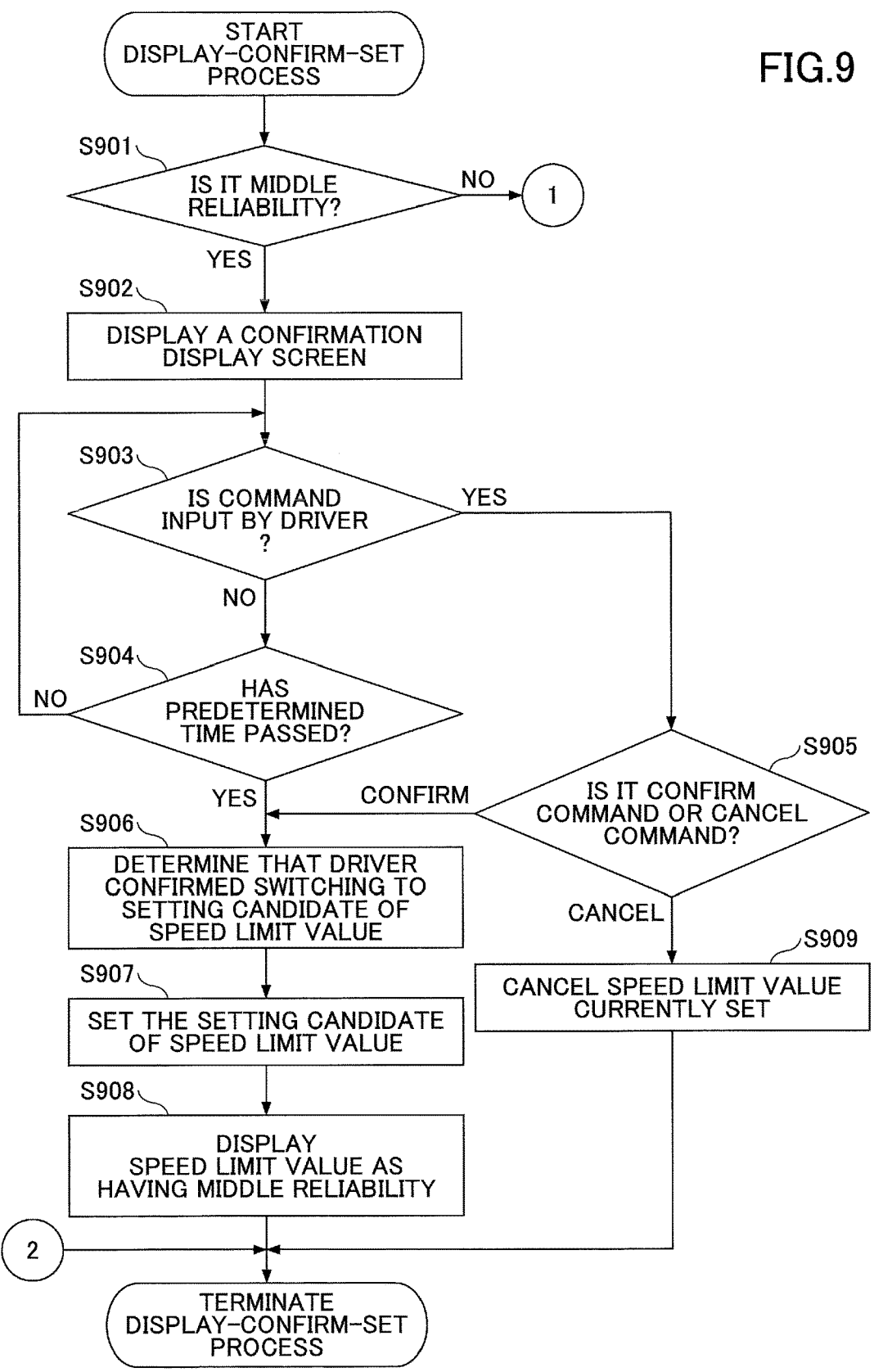
FIG. 9 is a part of a flowchart that illustrates a flow of a display-confirm-set process by a display control unit and a setting unit.
Figure 10:
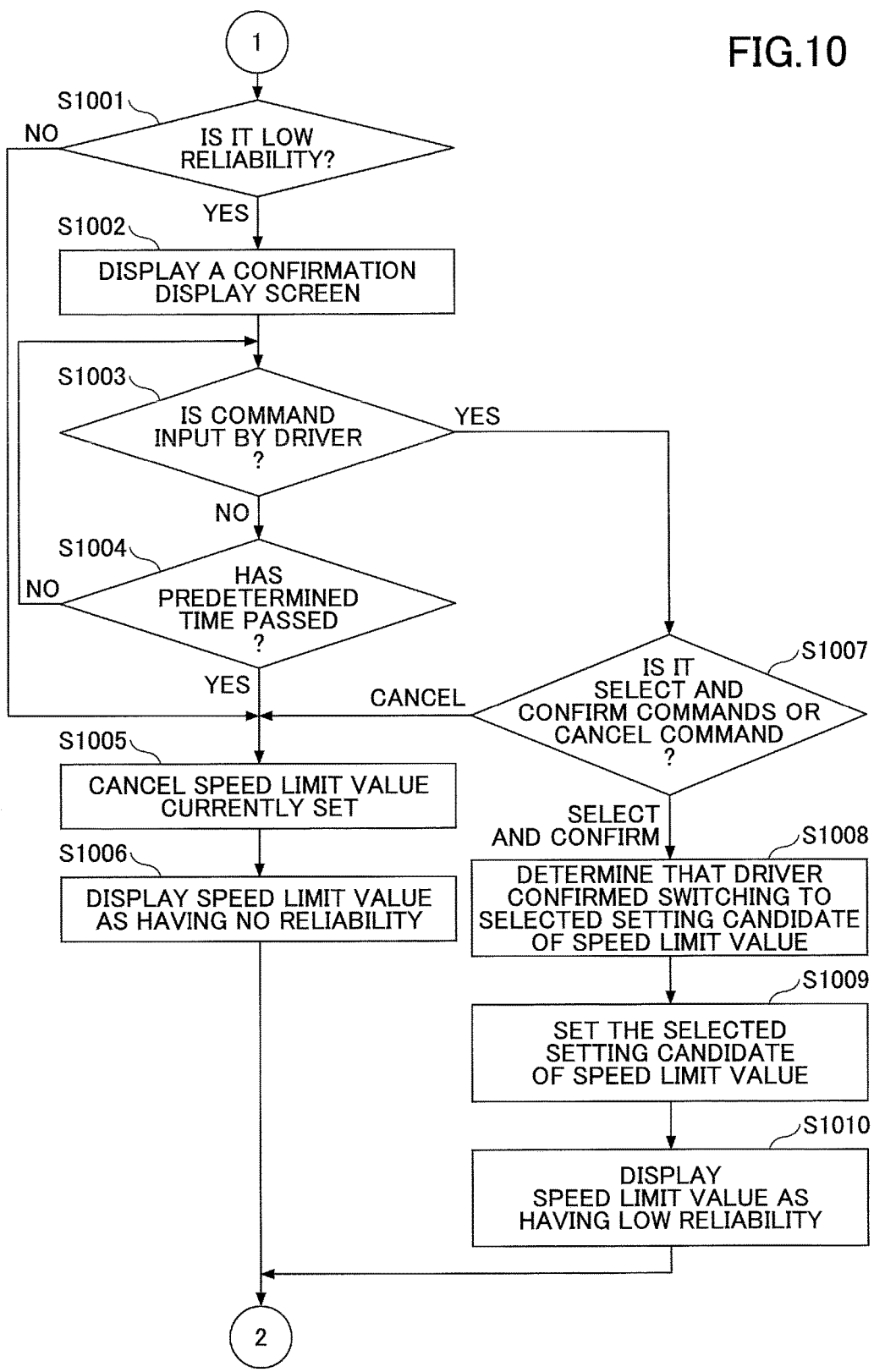
FIG. 10 is another part of the flowchart that illustrates the flow of the display-confirm-set process by the display control unit and the setting unit.

Next, a flow of the display-confirm-set process at Step S711 will be described using FIG. 9 and FIG. 10. FIG. 9 and FIG. 10 constitute a flowchart that illustrates the flow of the display-confirm-set process by the display control unit 304, the command reception unit 305, and the setting unit 306.

At Step S901, the confirmation display control unit 601 of the display control unit 304 determines whether the reliability determined by the reliability determination unit 303 is middle. At Step S901, if determining that the reliability is middle, the confirmation display control unit 601 goes forward to Step S902.

At Step S902, the confirmation display control unit 601 of the display control unit 304 displays a confirmation display screen to have the driver confirm that the speed limit value currently set will be switched to the setting candidate of the speed limit value. At Step S903, the command reception unit 305 determines whether a command has been input by the driver on the confirmation display screen.

At Step S903, if determining that a command has not been input by the driver, the confirmation display control unit 601 goes forward to Step S904. At Step S904, the confirmation display control unit 601 of the display control unit 304 determines whether the predetermined time has passed since the start of displaying the confirmation display screen. At Step S904, if determining that the predetermined time has not passed, the confirmation display control unit 601 goes back to Step S903.

On the other hand, at Step S904, if determining that the predetermined time has passed, the confirmation display control unit 601 goes forward to Step S906. At Step S906, the command reception unit 305 determines that the driver has confirmed that the speed limit value currently set would be switched to the setting candidate of the speed limit value displayed on the confirmation display screen. In this way, if a setting candidate of the speed limit value having the middle reliability is displayed on the confirmation display screen, and the driver does not input a command after the displaying, the command reception unit 305 determines that the driver has confirmed the setting candidate.

At Step S907, the setting unit 306 transmits the speed limit value displayed on the confirmation display screen as the setting candidate of the speed limit value to the co-ECU 140 as the upper limit speed value. At Step S908, the setting value display control unit 602 of the display control unit 304 displays the speed limit value set in the co-ECU 140 on the speed limit display screen by the display aspect specified for the middle reliability.

On the other hand, at Step S903, if determining that a command has been input by the driver, the confirmation display control unit 601 goes forward to Step S905. At Step S905, the command reception unit 305 determines whether the driver has input a confirm command or a cancel command on the confirmation display screen.

At Step S905, if determining that a confirm command has been input, the command reception unit 305 goes forward to Step S906, and executes Steps S906 to S908. Note that Steps S5906 to S908 have been already described, and their description is omitted here.

In this way, if a setting candidate of the speed limit value having the middle reliability is displayed on the confirmation display screen, and the driver inputs a confirm command, the command reception unit 305 determines that the driver has confirmed the setting candidate.

On the other hand, at Step S905, if determining that a cancel command has been input, the command reception unit 305 goes forward to Step S909. At Step S909, the setting unit 306 gives a command to the co-ECU 140 to cancel the speed limit value currently set.

In this way, if a setting candidate of the speed limit value having the middle reliability is displayed on the confirmation display screen, and the driver inputs a cancel command actively, the command reception unit 305 determines that the driver desires to cancel the speed limit value.

Next, a process will be described for a case where the reliability is determined to be other than middle. At Step S901, if the reliability is determined to be other than middle, the confirmation display control unit 601 goes forward to Step S1001 in FIG. 10.

At Step S1001, the confirmation display control unit 601 of the display control unit 304 determines whether the reliability determined by the reliability determination unit 303 is low. At Step S1001, if determining that the reliability is low, the confirmation display control unit 601 goes forward to Step S1002.

At Step S1002, the confirmation display control unit 601 of the display control unit 304 displays a confirmation display screen to have the driver select one of the setting candidates of the speed limit value. At Step S1003, the command reception unit 305 determines whether a command has been input by the driver on the confirmation display screen.

At Step S1003, if determining that a command has not been input by the driver, the confirmation display control unit 601 goes forward to Step S1004. At Step S1004, the confirmation display control unit 601 determines whether the predetermined time has passed since the start of displaying the confirmation display screen. At Step S1004, if determining that the predetermined time has not passed, the confirmation display control unit 601 goes back to Step S1003.

On the other hand, if determining that the predetermined time has passed, the confirmation display control unit 601 goes forward to Step S1005. At Step S1005, the command reception unit 305 determines that the driver does not desire for the speed limit value currently set to be switched to the setting candidate of the speed limit value. Furthermore, the setting unit 306 gives a command to the co-ECU 140 to cancel the speed limit value currently set.

Furthermore, at Step S1006, the setting value display control unit 602 of the display control unit 304 displays the display contents of the no reliability ("wait") on the speed limit display screen by the display aspect specified for the no reliability.

In this way, if a setting candidate of the speed limit value having the low reliability is displayed on the confirmation display screen, and the driver does not input a command after the displaying, the command reception unit 305 determines that the driver desires to cancel the speed limit value.

On the other hand, at Step S1003, if determining that a command has been input by the driver, the confirmation display control unit 601 goes forward to Step S1007. At Step S1007, the command reception unit 305 determines whether the driver has input a select command and a confirm command, or a cancel command on the confirmation display screen.

At Step S1007, if determining that a cancel command has been input, the command reception unit 305 goes forward to Step S1005. Note that the corresponding steps to Step S1005 and Step S1006 have been already described, and their description is omitted here.

In this way, if a setting candidate of the speed limit value having the low reliability is displayed on the confirmation display screen, and the driver inputs a cancel command actively, the command reception unit 305 also determines that the driver desires to cancel the speed limit value.

On the other hand, at Step S1007, if determining that the driver has input a select command and a confirm command, the command reception unit 305 goes forward to Step S1008. At Step S1008, the command reception unit 305 determines that the driver has confirmed one of the setting candidates of the speed limit value displayed on the confirmation display screen, which has been selected by the driver.

At Step S1009, the setting unit 306 transmits the selected one of the setting candidates of the speed limit value to the co-ECU 140 as the speed limit value to be set as the upper limit speed value. At Step S1010, the setting value display control unit 602 of the display control unit 304 displays the speed limit value set in the co-ECU 140 on the speed limit display screen by the display aspect specified for the low reliability.

On the other hand, at Step S1001, if determining that the reliability is not low, the confirmation display control unit 601 goes directly forward to Step S1005. The reliability being not low implies that it is determined as having no reliability.

In this case, without having the driver confirm it, the setting unit 306 gives a command to the co-ECU 140 to cancel the speed limit value currently set (Step S1005). Furthermore, at Step S1006, the setting value display control unit 602 of the display control unit 304 displays the display contents of the no reliability ("wait") on the speed limit display screen by the display aspect specified for the no reliability.

<10. Display Examples>

Next, display examples on the display unit 131 in the setting control system 100 will be described according to the embodiment. Note that the display examples will be described by contrasting with those on a display unit in a conventional control system for a vehicle.

<10.1 Display Examples on Display Unit in Conventional Control System for a Vehicle>

Figure 11:
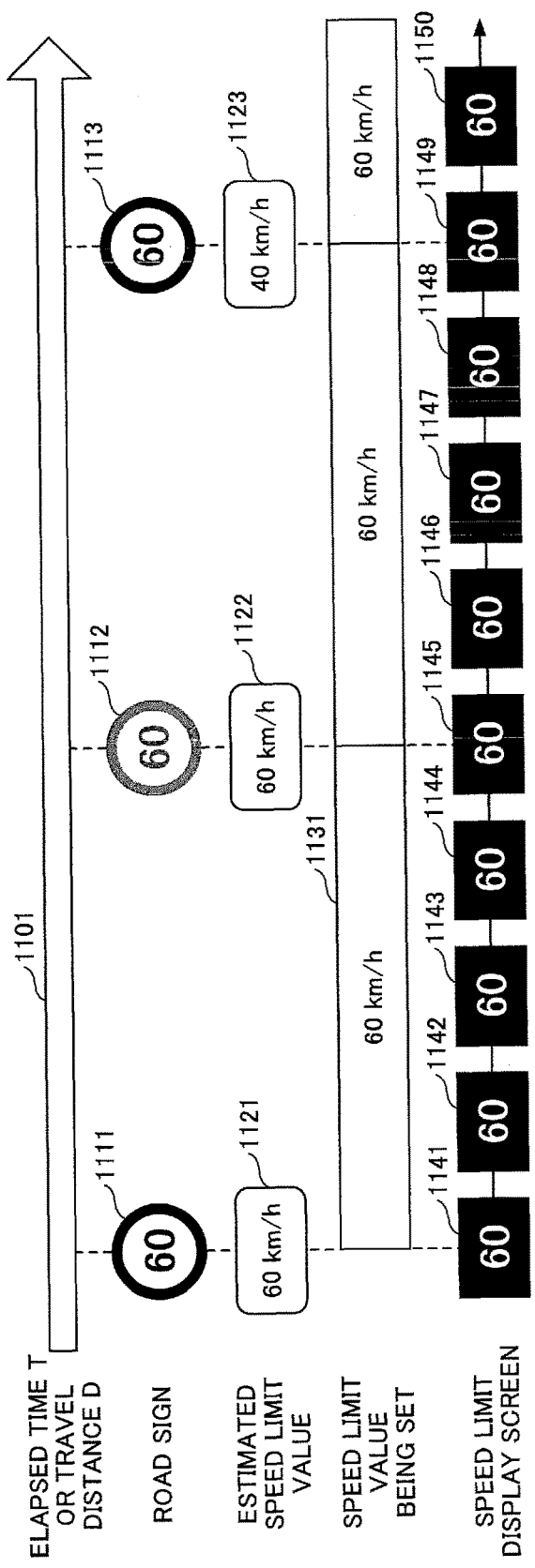
FIG. 11 is a diagram that illustrates display examples on a display unit according to a conventional control system for a vehicle.

First, display examples on a display unit in a conventional control system for a vehicle will be described. FIG. 11 is a diagram that illustrates display examples on a display unit according to a conventional control system for a vehicle.

In FIG. 11, a bold arrow 1101 represents the elapsed time or the travel distance since traveling has been started, and road signs 1111 to 1113 are captured during the elapsed time (or the travel distance). Among these, the road signs 1111 and 1113 are captured successfully to obtain the speed limit values based on the image information. On the other hand, the road sign 1112 is captured in a bad condition, and the speed limit value cannot be obtained based on the image information.

In such a conventional control system for a vehicle, the speed limit value is estimated by obtaining a speed limit value based on a road sign, and in parallel with that, by obtaining the information from a navigation device. Estimated speed limit values 1121 to 1123 represent speed limit values estimated based on the information obtained from the navigation device.

Furthermore, a rectangular band 1131 represents the speed limit values set for respective intervals in the elapsed time or the travel distance. Note that the conventional control system for a vehicle sets one of a speed limit value based on a road sign, and an estimated speed limit value estimated based on the information obtained from the navigation device, which are switched based on a priority condition.

In the example in FIG. 11, if the speed limit value based on the road sign 1111 is obtained, the speed limit value "60 km/h" is set. Also, if a speed limit value cannot be obtained based on the road sign 1112, the estimated speed limit value 1122 "60 km/h" is set. Furthermore, if the speed limit value based on the road sign 1113 is obtained, the speed limit value "60 km/h" is set.

Consequently, on speed limit display screens 1141 to 1150, "60 km/h" continues to be displayed as the set speed limit value.

In this way, by using the conventional control system for a vehicle, the driver cannot distinguish whether the speed limit value set as the upper limit speed value is based on a speed limit value based on a road sign, or based on an estimated speed limit value estimated based on the information obtained from the navigation device. Consequently, the driver may continue driving without knowing that the vehicle speed is limited by a speed limit value having an inferior reliability.

<10.2 First Display Examples on Display Unit in Setting Control System According to the Embodiment>

Figure 12:
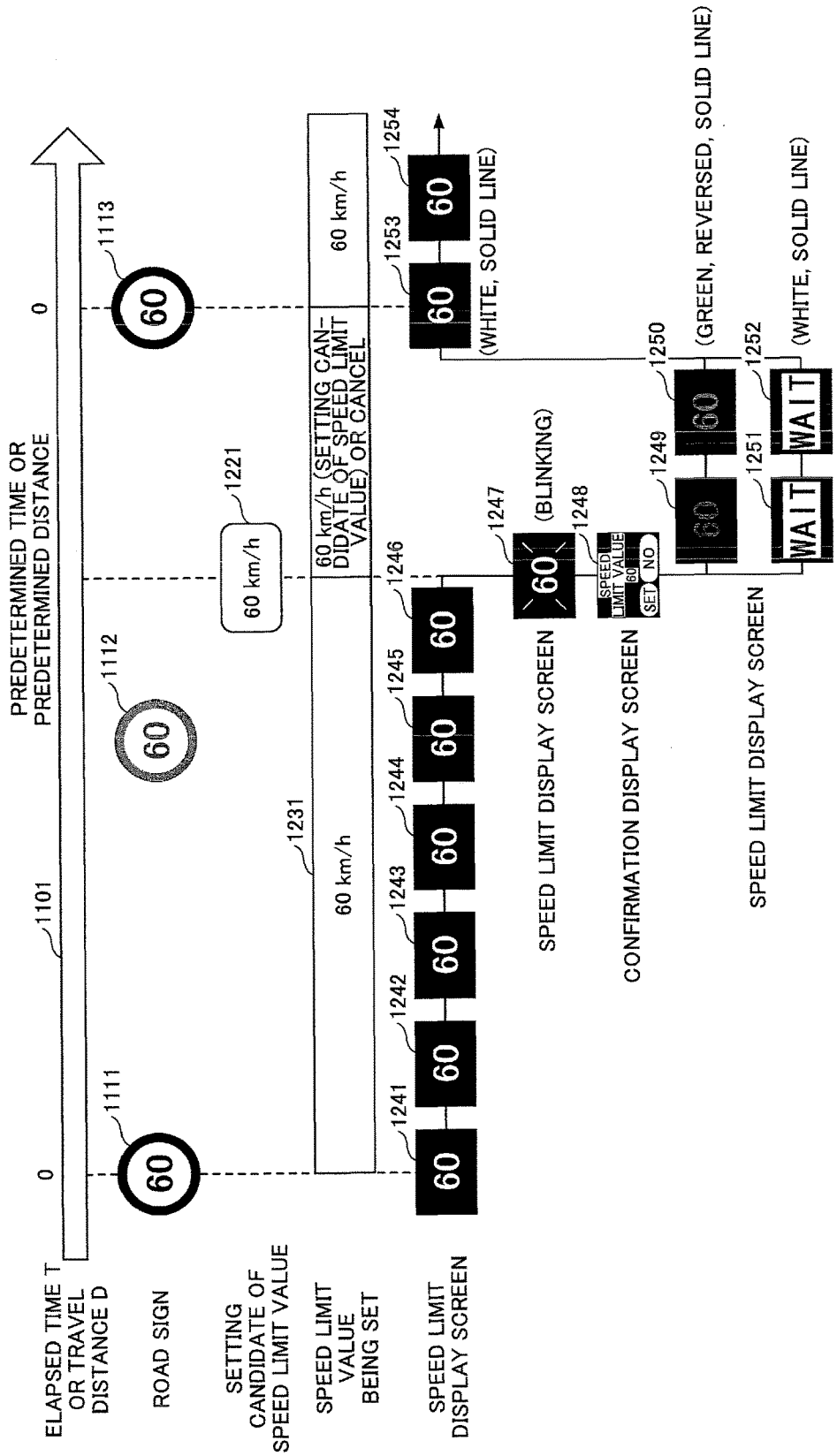
FIG. 12 is a diagram that illustrates first display examples on a display unit in a control system for a vehicle according to a first embodiment.

Next, first display examples on the display unit 131 in the setting control system 100 according to the embodiment will be described. FIG. 12 is a diagram that illustrates first display examples on the display unit 131 in the setting control system 100 according to the embodiment.

Note that the example in FIG. 12 illustrates display examples in a case where the speed limit value cannot be obtained based on the road sign 1112, and the elapsed time T since the speed limit value has been obtained, reaches the predetermined time (or the travel distance D reaches the predetermined distance).

As illustrated in FIG. 12, until the elapsed time T reaches the predetermined time (or the travel distance D reaches the predetermined distance) since the speed limit value has been obtained, the speed limit value "60 km/h" is set as the upper limit speed value (see the rectangular band 1231). Also, on speed limit display screens 1241 to 1246, the speed limit value based on the road sign 1111 is displayed.

On the other hand, once the elapsed time T reaches the predetermined time (or the travel distance D reaches the predetermined distance) since the speed limit value has been obtained, the speed limit value being displayed starts blinking on a speed limit display screen 1247. This makes it possible for the driver to recognize that the speed limit value currently set will be switched to a speed limit value having an inferior reliability.

After the speed limit value has been displayed and blinked on the speed limit display screen 1247 for a certain time, a confirmation display screen 1248 is displayed on the display unit 131. As illustrated in FIG. 12, on the confirmation display screen 1248, a setting candidate of the speed limit value 1221 determined by the candidate determination unit 503 of the reliability determination unit 303 is displayed when the elapsed time T reaches the predetermined (or when the travel distance D reaches the predetermined distance). Note that the example in FIG. 12 illustrates a case where a setting candidate of the speed limit value "60 km/h" having the middle reliability is determined by the candidate determination unit 503.

If the driver presses a "set" button in response to the confirmation display screen 1248 being displayed (or does not input a command for a predetermined time), the setting candidate of the speed limit value 1221 displayed on the confirmation display screen 1248 is transmitted to the co-ECU 140 as the upper limit speed value.

Therefore, the newly set speed limit value "60 km/h" is displayed on a speed limit display screen 1249 on the display unit 131. Note that the newly set speed limit value is displayed on the speed limit display screen 1249 by the display aspect specified for the middle reliability (green, reverse, solid-line characters).

On the other hand, if the driver presses "no" button in response to the confirmation display screen 1248 being displayed, the speed limit value currently set is canceled (in this case, the vehicle-speed limiting based on the speed limit value is stopped). Therefore, the characters "wait" are displayed on the speed limit display screen 1251 of the display unit 131 by white, solid lines.

Displaying the speed limit value "60 km/h" having the middle reliability or displaying "wait", continues until a speed limit value is newly obtained based on the road sign 1113 (see a speed limit display screen 1250 or 1252). Once the speed limit value is obtained based on the next road sign 1113, the elapsed time T or the travel distance D is reset, and the obtained speed limit value ("60 km/h" in the example in FIG. 12) is newly set in the co-ECU 140 as the upper limit speed value. Consequently, if the vehicle-speed limiting has been stopped, the vehicle-speed limiting is resumed based on the speed limit value, and the newly set speed limit value is displayed on speed limit display screens 1253 and 1254.

In this way, when switching the speed limit value currently set to a speed limit value having an inferior reliability, the setting control system 100 according to the embodiment gives the driver a notice about the switching in advance, by blinking the speed limit value currently set on the speed limit display screen. Also, by displaying the setting candidate of the speed limit value having an inferior reliability on the confirmation display screen, the setting control system 100 has the driver confirm the switching will take place to the setting candidate of the speed limit value. Furthermore, after having switched to the speed limit value having the inferior reliability, the setting control system 100 displays the speed limit value by the display aspect depending on the reliability to clearly indicate that the set speed limit value is a speed limit value having the inferior reliability.

Consequently, the driver can recognize that the vehicle-speed limiting is based on the speed limit value having the inferior reliability.

<10.3 Second Display Examples on Display Unit in Setting Control System According to the Embodiment>

Figure 13:
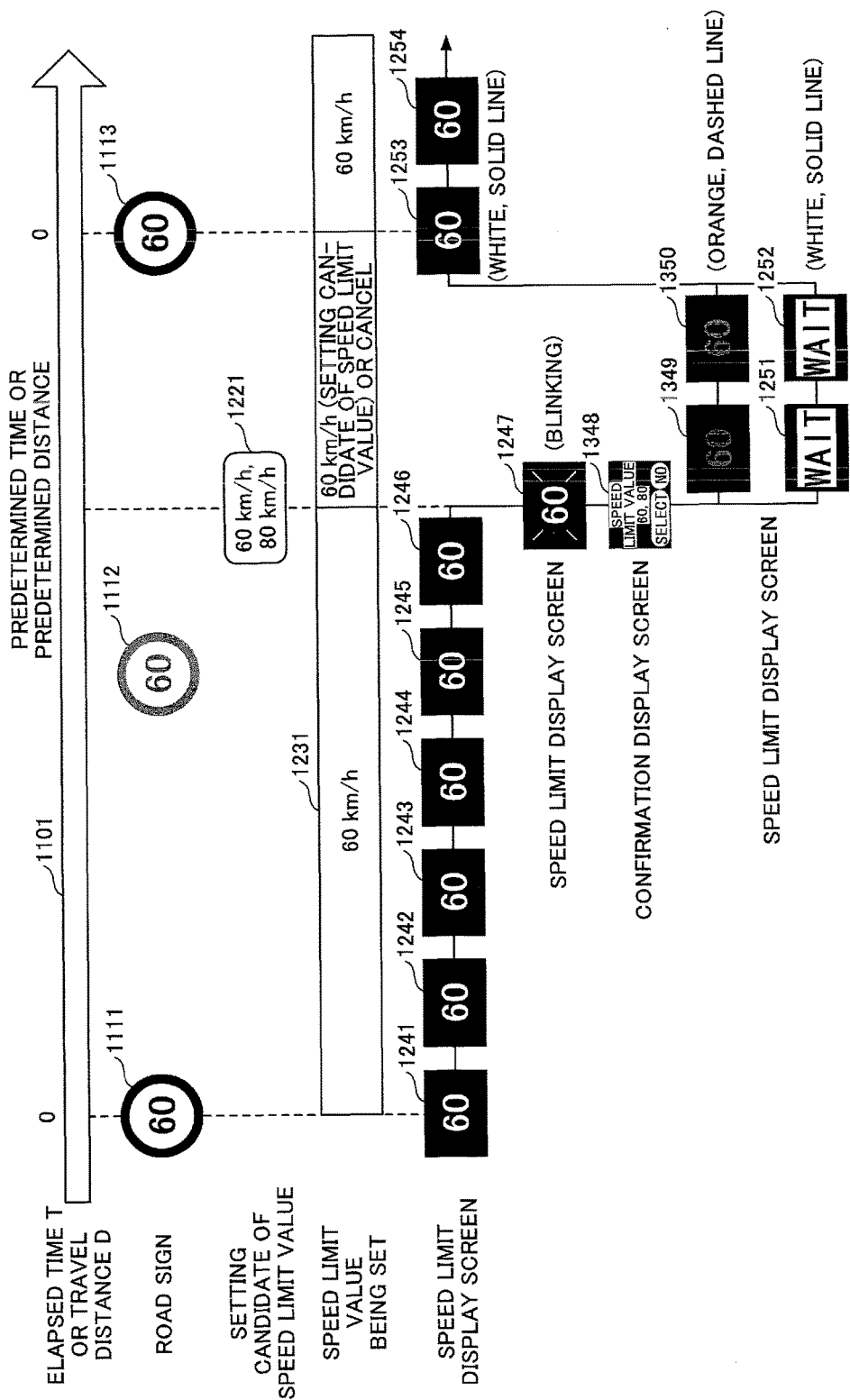
FIG. 13 is a diagram that illustrates second display examples on a display unit in a control system for a vehicle according to the first embodiment.

Next, second display examples on the display unit 131 in the setting control system 100 according to the embodiment will be described. FIG. 13 is a diagram that illustrates second display examples on the display unit 131 in the setting control system 100 according to the embodiment.

Here, a difference from FIG. 12 is that multiple setting candidates of the speed limit value having the low reliability are determined by the candidate determination unit 503.

As illustrated in FIG. 13, on a confirmation display screen 1348 displayed when the elapsed time T reaches the predetermined time (or the travel distance D reaches the predetermined distance), multiple setting candidates of the speed limit value 1221 determined by the candidate determination unit 503 of the reliability determination unit 303 are displayed. Since there are multiple setting candidates of the speed limit value having the low reliability (two in the example of in FIG. 13, "60 km/h" and "80 km/h"), the multiple setting candidates of the speed limit value are displayed on the confirmation display screen 1348.

If the driver selects "60 km/h" among the setting candidates of the speed limit value in response to the confirmation display screen 1348 being displayed, and presses a "select" button, the selected setting candidate of the speed limit value "60 km/h" is set in the co-ECU 140 as the upper limit speed value.

Therefore, the newly set speed limit value "60 km/h" is displayed on a speed limit display screen 1349 on the display unit 131. Note that the newly set speed limit value is displayed on the speed limit display screen 1349 by the display aspect specified for the low reliability (orange, solid-line characters).

On the other hand, if the driver presses "no" button in response to the confirmation display screen 1348 being displayed, or does not input a command for a predetermined time, the speed limit value currently set is canceled. Therefore, the characters "wait" are displayed on the speed limit display screen 1251 of the display unit 131 by white, solid lines.

Displaying the speed limit value "60 km/h" having the low reliability or displaying "wait", continues until a speed limit value is newly obtained based on the road sign 1113 (see a speed limit display screen 1350 or 1252). Once the speed limit value is obtained based on the next road sign 1113, the elapsed time T or the travel distance D is reset, and the obtained speed limit value ("60 km/h" in the example in FIG. 13) is newly set in the co-ECU 140 as the upper limit speed value. Consequently, for example, if the vehicle-speed limiting has been stopped, the vehicle-speed limiting is resumed based on the speed limit value, the newly set speed limit value is displayed on the speed limit display screens 1253 and 1254.

In this way, the setting control system 100 according to the embodiment has the driver select one of multiple setting candidates of the speed limit value having the low reliability when having the driver confirm the switching to a speed limit value having an inferior reliability. Also, the setting candidate of the speed limit value having the low reliability is not selected unless the driver presses the "select" button actively. Furthermore, if the driver presses "no" button or does not input a command for the predetermined time, the speed limit value currently set is canceled. Thus, the driver can select and switch the speed limit value.

<10.4 Third Display Examples on Display Unit in Setting Control System According to the Embodiment>

Figure 14:
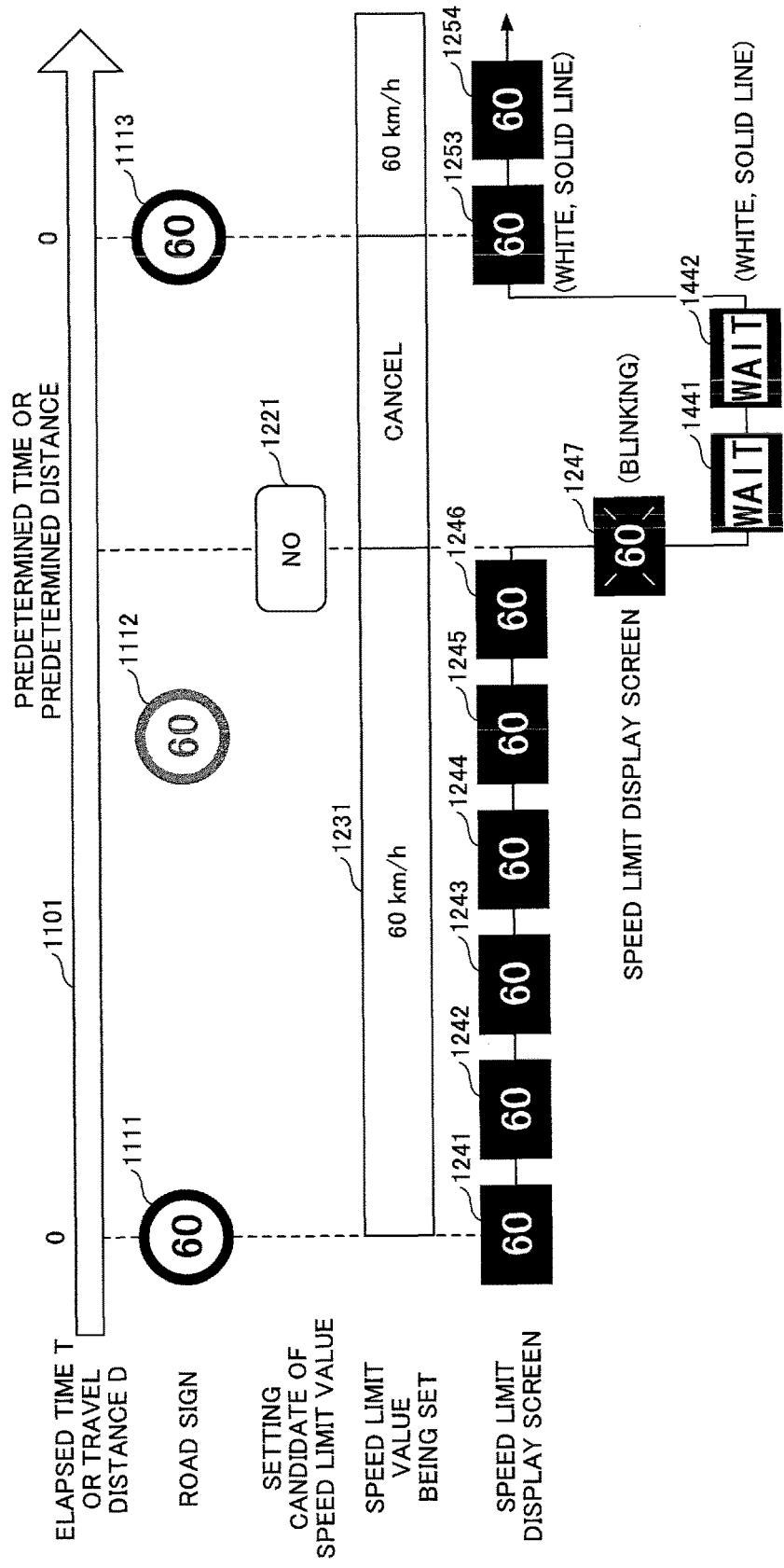
FIG. 14 is a diagram that illustrates third display examples on a display unit in a control system for a vehicle according to the first embodiment.

Next, third display examples on the display unit 131 in the setting control system 100 according to the embodiment will be described. FIG. 14 is a diagram that illustrates third display examples on the display unit 131 in the setting control system 100 according to the embodiment.

Here, a difference from FIG. 12 is that the candidate determination unit 503 has determined that there is no reliability (no setting candidate of the speed limit value).

As illustrated in FIG. 14, when the elapsed time T reaches the predetermined time (or the travel distance D reaches the predetermined distance) since the speed limit value has been obtained, the speed limit value being displayed starts blinking on the speed limit display screen 1247. This makes the driver recognize that the speed limit value currently set will be switched to a speed limit value having an inferior reliability.

After the speed limit value has been displayed and blinked on the speed limit display screen 1247 for a certain time, the speed limit value currently set is canceled (in this case, the vehicle-speed limiting based on the speed limit value is stopped). Therefore, the characters "wait" are displayed on a speed limit display screen 1441 of the display unit 131 by white, solid lines.

Displaying "wait" continues until a speed limit value is newly obtained based on the road sign 1113 (see a speed limit display screen 1442). Once the speed limit value is obtained based on the next road sign 1113, the elapsed time T or the travel distance D is reset, and the obtained speed limit value ("60 km/h" in the example in FIG. 14) is set. Consequently, the vehicle-speed limiting is resumed based on the speed limit value, and the newly set speed limit value is displayed on the speed limit display screens 1253 and 1254.

In this way, when the speed limit value currently set is to be canceled, the setting control system 100 according to the embodiment gives the driver a notice about the canceling in advance, by blinking the speed limit value being displayed on the speed limit display screen. Consequently, the driver can recognize in advance that the vehicle-speed limiting will be canceled.

<11. Summary>

As clarified by the above description, the embodiment is configured to switch from the speed limit value having higher reliability to the speed limit value having an inferior reliability, when the measured elapsed time T has reached the predetermined time (or the travel distance D has reached the predetermined distance); and to give the driver a notice of the switching or the canceling, before switching from the speed limit value having the high reliability to the speed limit value having the inferior reliability or before canceling the speed limit value, by blinking the display of the speed limit value currently set.

This makes it possible for the driver to grasp that the likelihood is high for the road sign recognition unit to have failed in recognizing a speed limit value that should have been recognized, and if that is the case, it is likely that the vehicle-speed limiting is executed based on a speed limit value that is different from the speed limit value on a road on which the vehicle is traveling now. Consequently, the driver can avoid the vehicle-speed limiting being executed based on the speed limit value that is different from the speed limit value on the road on which the vehicle is traveling now, by switching the speed limit value.

The embodiment is also configured to display a setting candidate(s) of the speed limit value on the confirmation display screen before switching from the speed limit value having the high reliability to the speed limit value having the inferior reliability, to have the driver confirm the switching;

to set the setting candidate displayed on the confirmation display screen when the setting candidate of the speed limit value has the middle reliability, unless the driver cancels it actively;

to avoid setting a selected setting candidate when the setting candidate of the speed limit value has the low reliability, unless the driver selects it actively; and to display the speed limit value after having switched from the speed limit value having the high reliability to the speed limit value having the inferior reliability by the display aspect specified for the inferior reliability.

Thus, the driver can confirm a setting candidate on the confirmation display screen, can determine whether it is an appropriate setting candidate, and can switch to it. Consequently, the driver can avoid the vehicle-speed limiting being executed based on the speed limit value that is different from the speed limit value on the road.

[Second Embodiment]

In the first embodiment, the display process has been described that is executed for switching from the speed limit value having the high reliability to a speed limit value having an inferior reliability when the measured elapsed time T has reached the predetermined time (or when the travel distance D has reached the predetermined distance). In contrast to this, in a second embodiment, a display process will be described that is executed until the measured elapsed time T reaches the predetermined time (or until the travel distance D reaches the predetermined distance).

As described above, until the measured elapsed time T reaches the predetermined time (or until the travel distance D reaches the predetermined distance), a speed limit value based on a road sign is set in the co-ECU 140 as the upper limit speed value. Therefore, the reliability of the speed limit value during this period is regarded as high.

However, even if a speed limit value is obtained from a highly reliable information source as in case of a speed limit value based on a road sign, as the time passes by since the obtainment (or the travel distance accumulates), the reliability of the speed limit value goes in the degrading direction. Thereupon, the second embodiment is configured to have the driver be able to recognize that the reliability of a speed limit value based on a road sign goes in the degrading direction. In the following, the second embodiment will be described.

<1. Flow of Process for Setting the Speed Limit Value>

Figure 15:
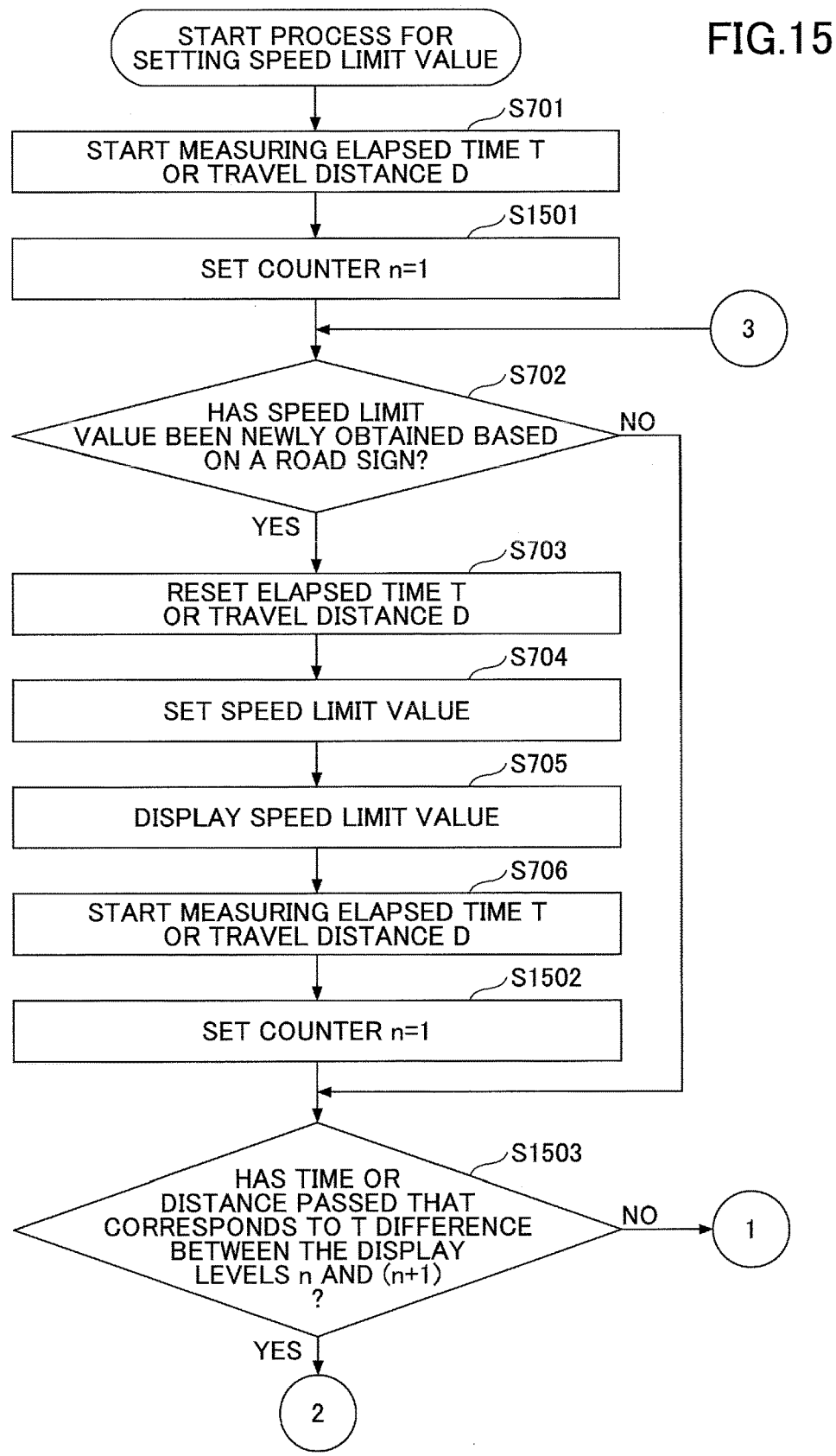
FIG. 15 is a part of a flowchart that illustrates a flow of a process for setting the speed limit value according to a second embodiment.
Figure 16:
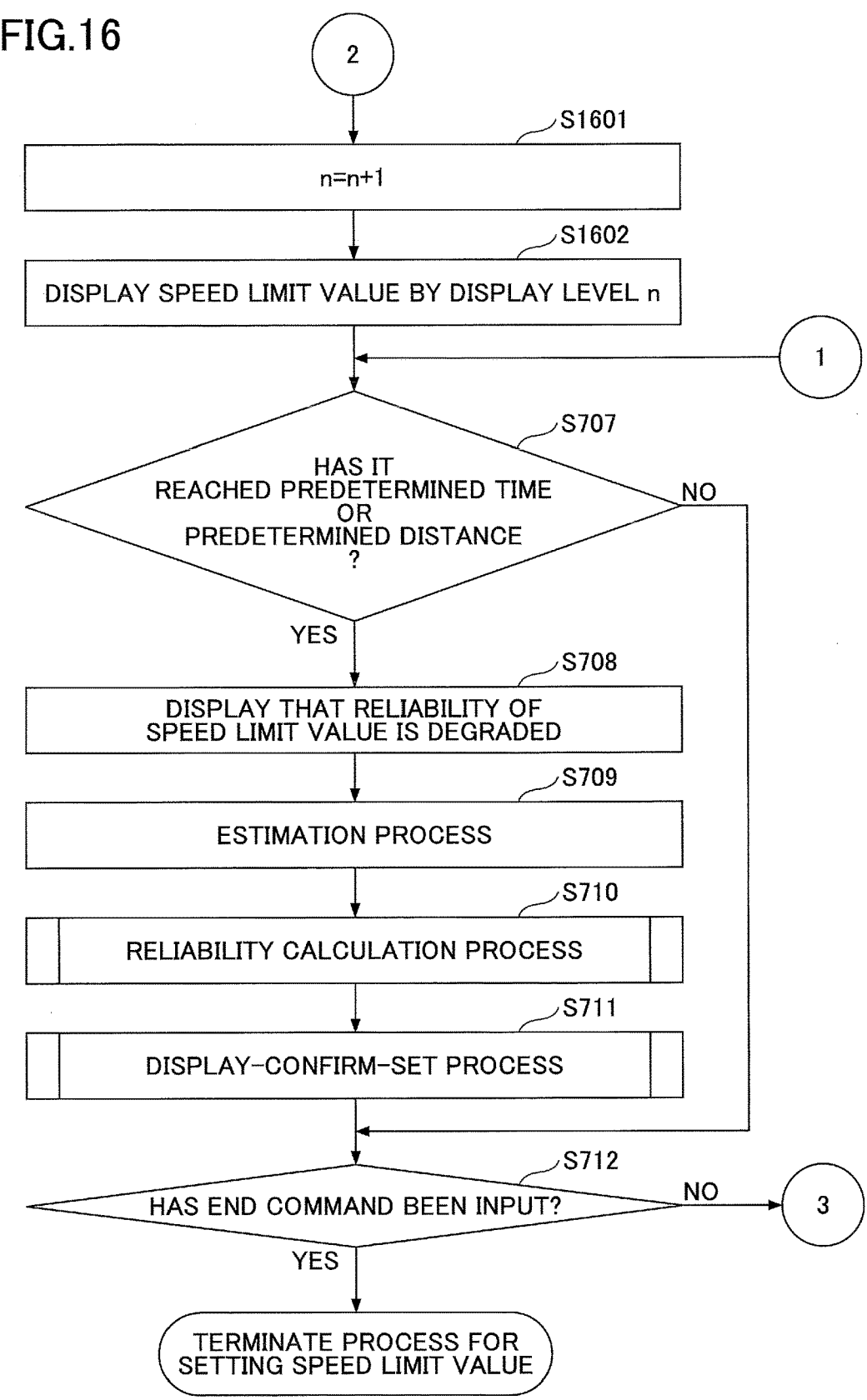
FIG. 16 is another part of the flowchart that illustrates the flow of the process for setting the speed limit value according to the second embodiment.

First, a flow of the process for setting the speed limit value will be described according to the second embodiment. FIG. 15 and FIG. 16 constitute a flowchart that illustrates the flow of the process for setting the speed limit value. Here, steps in the flowchart in FIG. 15 and FIG. 16 that are substantially the same as the steps in FIG. 7 are assigned the same reference numbers, and their description is omitted.

Steps S1501, S1502, and S1503 in FIG. 15 are different from FIG. 7. Also, Steps S1601 and S1602 in FIG. 16 are different from FIG. 7. As illustrated in FIG. 15, at Step S701 or S706, when measurement of the elapsed time T or the travel distance D is started, the setting value display control unit 602 of the display control unit 304 sets "1" in a counter n at Step S1501 or S1502.

Note that the counter n is a parameter to represent the regressing of the reliability going down in the degrading direction. In the embodiment, as the counter n increases, the color of characters showing the speed limit value on the speed limit display screen gets close to the background color of the speed limit display screen. This makes it possible for the driver to recognize that the reliability of a speed limit value based on a road sign goes down in the degrading direction.

At Step S1503, the setting value display control unit 602 of the display control unit 304 determines whether the time that corresponds to a difference between the display levels n and (n+1), has passed based on the elapsed time T.

Alternatively, the setting value display control unit 602 determines whether the distance that corresponds to a difference between the display levels n and (n+1), has accumulated based on the travel distance D. Here, it is assumed that the time or the distance that corresponds to the difference between the display levels n and (n+1) (namely, the display level advances by one stage) has been defined in advance.

At Step S1503, if determining that the time that corresponds to the difference between the display levels n and (n+1) has not passed (or the distance has not accumulated), the setting value display control unit 602 goes forward to Step S707 in FIG. 16. On the other hand, at Step S1503, if determining that the time that corresponds to the difference between the display levels n and (n+1) has passed (or the distance has accumulated), the setting value display control unit 602 goes forward to Step S1601 in FIG. 16.

At Step S1601, the setting value display control unit 602 of the display control unit 304 increments the counter n. At Step S1602, the setting value display control unit 602 of the display control unit 304 displays the speed limit value currently set by the display level n. Note that it is assumed that the color of characters that corresponds to the display level n has been defined in advance.

Thus, as the time passes (or as the travel distance accumulates) since the obtainment of a speed limit value based on a road sign, the counter n increases, and the speed limit value currently set is displayed by the color of characters depending on the counter n. Consequently, the driver can recognize that the reliability of a speed limit value based on a road sign goes down in the degrading direction.

<2. Display Examples>

Figure 17:
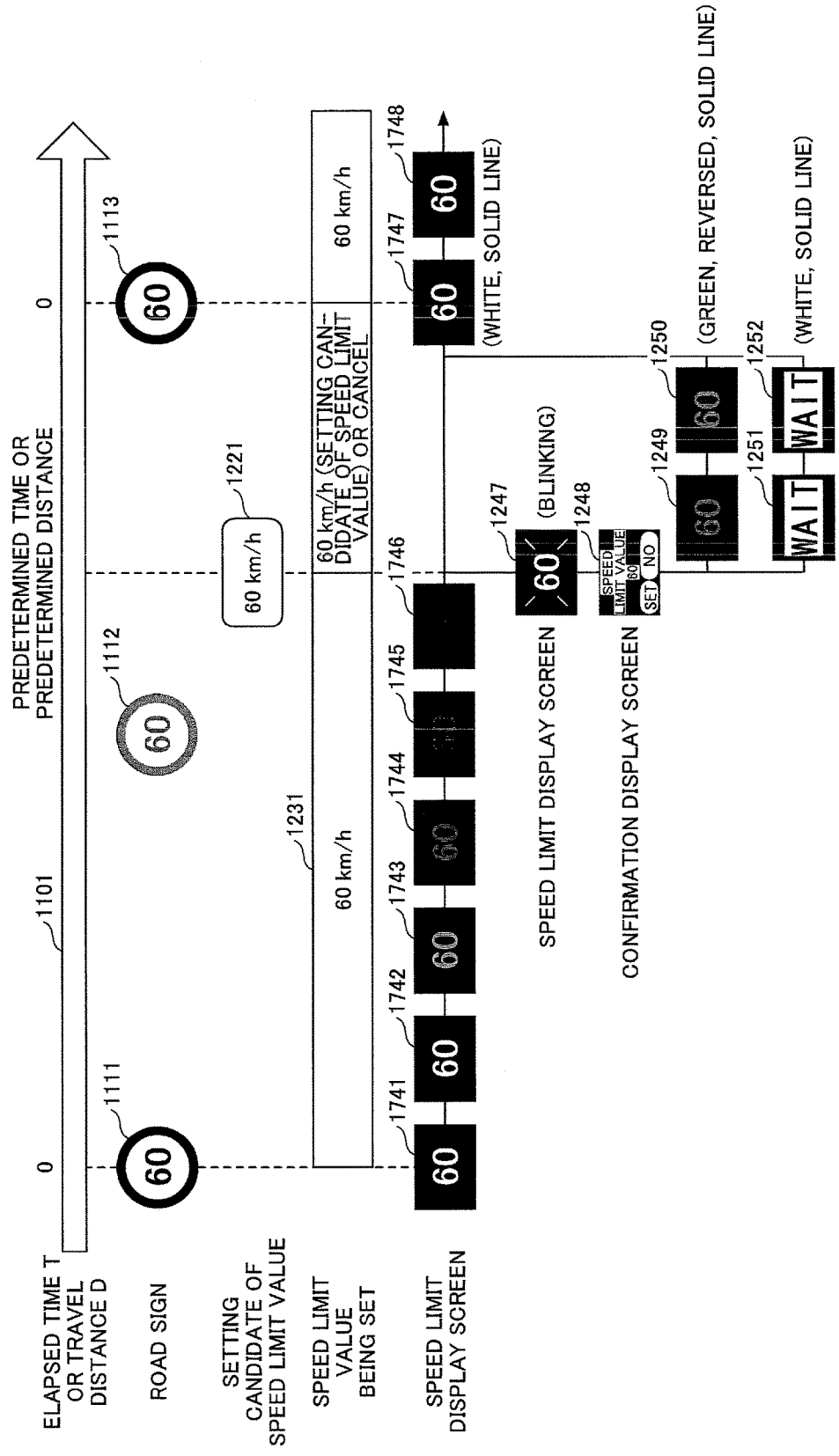
FIG. 17 is a diagram that illustrates display examples on a display unit according to the second embodiment.

Next, display examples on the display unit 131 in the setting control system 100 according to the embodiment will be described. FIG. 17 is a diagram that illustrates display examples on the display unit 131 in the setting control system 100 according to the second embodiment. Here, elements illustrated in FIG. 17 that are substantially the same as those in FIG. 12 are assigned the same reference numbers, and their description is omitted.

Speed limit display screens 1741 to 1746, 1747, and 1748 are different from FIG. 12. The speed limit display screens 1741 and 1742 are speed limit display screens of the display level 1. Also, the speed limit display screens 1743, 1744, 1745, and 1746 are speed limit display screens of the display levels 2, 3, 4, and 5, respectively.

In this way, according to the embodiment, as the time passes (or as the travel distance accumulates) since the speed limit value has been set based on the road sign 1111, the color of characters showing the speed limit value gets close to the background color of the speed limit display screen. This makes it possible for the driver to recognize that the reliability of the speed limit value based on the road sign 1111 goes down in the degrading direction.

[Third Embodiment]

The second embodiment has been described with an assumption that as the time passes (or the travel distance accumulates) since the speed limit value has been set based on a road sign, the reliability of the speed limit value based on the road sign goes down in the degrading direction.

However, the reliability of a speed limit value based on a road sign may not go down in the degrading direction as the time passes (or the travel distance accumulates). For example, even when the time has passed, if a setting candidate of the speed limit value calculated based on information other than a road sign is the same as the speed limit value based on the road sign, it is possible to determine that the reliability of the speed limit value based on the road sign does not go down in the degrading direction.

Taking such a case into account, the third embodiment is configured to update the regressing of the reliability of a speed limit value based on a road sign in the degrading direction, based on the setting candidate of the speed limit value, and display the speed limit value in accordance with the updated regressing. In the following, the third embodiment will be described mainly focusing on different points from the second embodiment.

<1. Functional Configuration of ECU to Set the Speed Limit>

Figure 18:
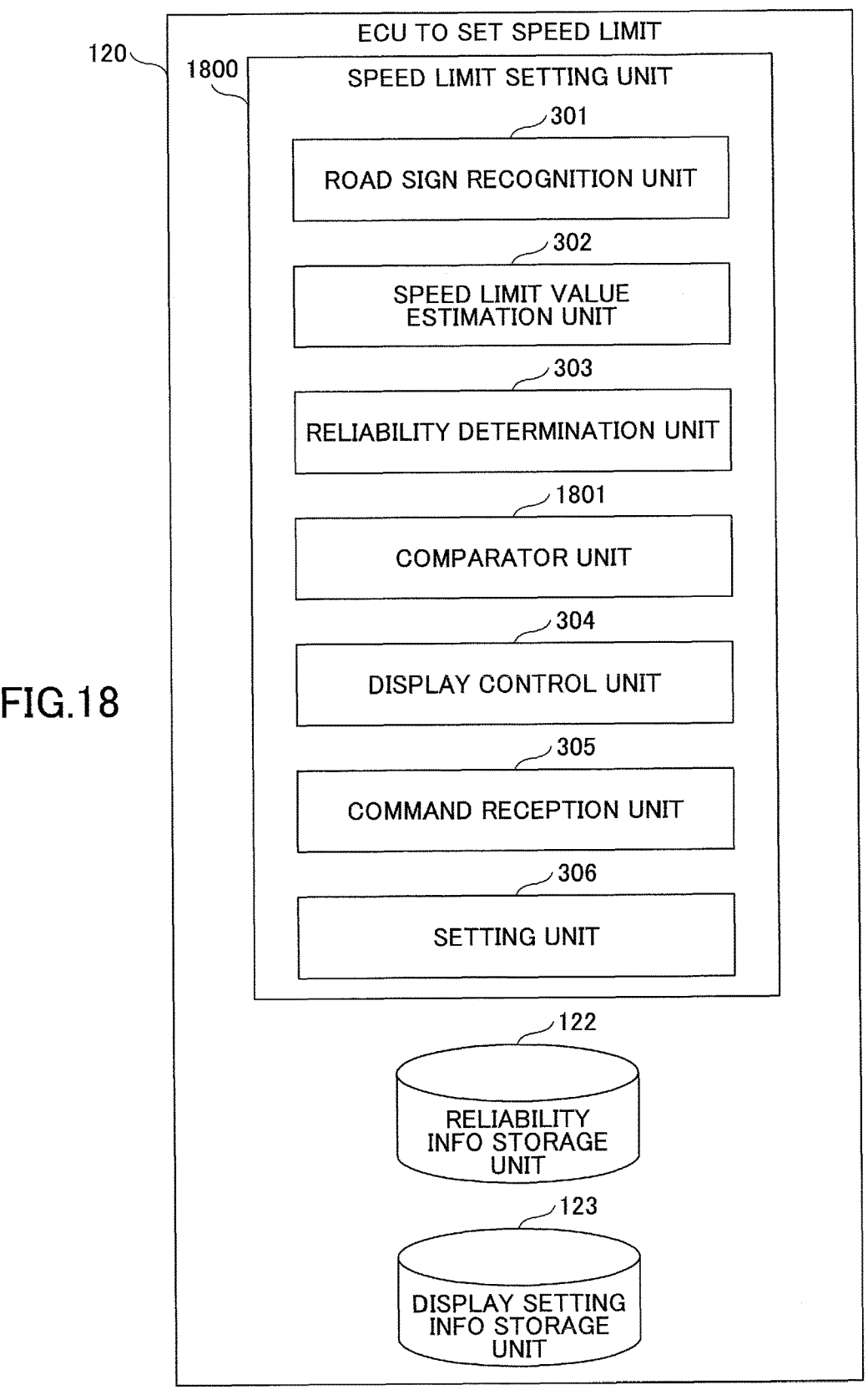
FIG. 18 is a diagram that illustrates a functional configuration of an ECU to set the speed limit according to a third embodiment.

First, functional units of the ECU to set the speed limit 120 that collectively function as the speed limit setting unit 1800, will be described. FIG. 18 is a diagram that illustrates a functional configuration of the ECU to set the speed limit 1800. As illustrated in FIG. 18, the speed limit setting unit 1800 further includes a comparator unit 1801, in addition to the elements of the ECU to set the speed limit 120 described with reference to FIG. 3.

The comparator unit 1801 compares the speed limit value currently set, with the setting candidate of the speed limit value determined by the reliability determination unit 303, and if they are equivalent, indicates it to the display control unit 304.

The display control unit 304 has substantially the same function as that of the display control unit 304 described in the second embodiment. However, if the indication from the comparator unit 1801 is received when going to display the speed limit value currently set on the speed limit display screen by the display level n, the display control unit 304 resets the display level n (back to the initial state).

<2. Flow of Process for Setting the Speed Limit Value>

Next, a flow of the process for setting the speed limit value by the speed limit setting unit 1800 will be described. The process for setting the speed limit value according to the embodiment is a combination of the flowchart illustrated in FIG. 15 and the flowchart illustrated in FIG. 19. Note that the flowchart illustrated in FIG. 15 has been described in the second embodiment, and the description is omitted here. Here, steps in the flowchart in FIG. 19 that are substantially the same as the steps in FIG. 16 are assigned the same reference numbers, and their description is omitted here. Steps Step S1901 to S1908 in FIG. 19 are different from FIG. 16.

At Step S1503, if determining that the time or the distance reaches the difference between the display levels n and (n+1), the speed limit value estimation unit 302 goes forward to Step S1901.

Figure 19:
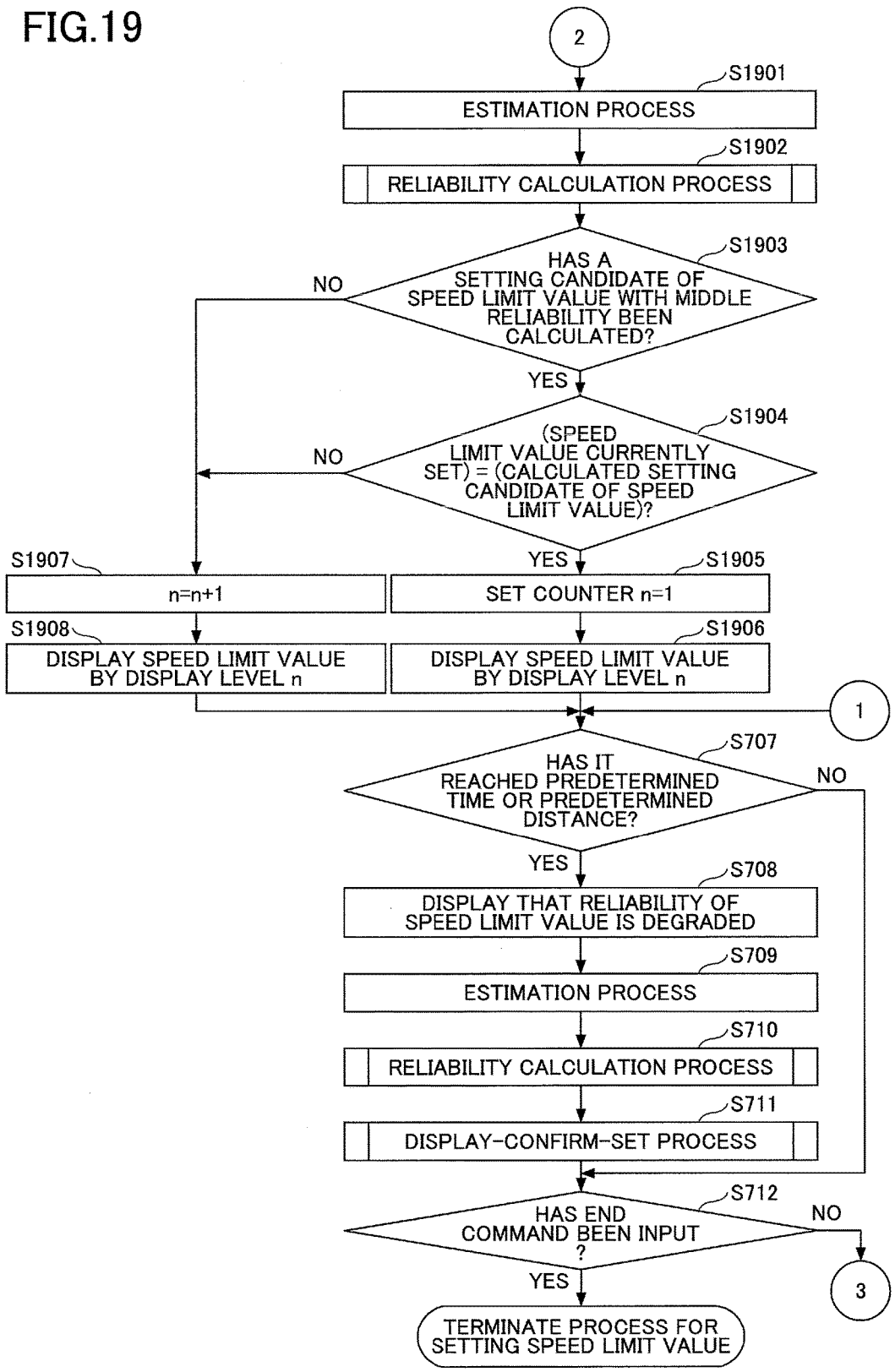
FIG. 19 is a part of a flowchart that illustrates a flow of a process for setting the speed limit value according to the third embodiment.

As illustrated in FIG. 19, at Step S1901, the speed limit value estimation unit 302 calculates the first to fourth estimated speed limit values and the first to third vehicle speed range settings. At Step S1902, the reliability determination unit 303 calculates the weight added values of the estimated speed limit values, respectively, based on the first to fourth estimated speed limit values and the first to third vehicle speed range settings calculated at Step S1901. Furthermore, based on the calculated weight added values, the reliability determination unit 303 determines a setting candidate of the speed limit value. Note that since the reliability calculation process at Step S1902 has already been described in detail using FIG. 8, a detailed description is omitted here.

At Step S1903, the comparator unit 1801 determines whether a setting candidate of the speed limit value having the middle reliability has been calculated in the reliability calculation process at Step S1902. At Step S1903, if determining that the setting candidate of the speed limit value having the middle reliability has been calculated, the comparator unit 1801 goes forward to Step S1904.

At Step S1904, the comparator unit 1801 determines whether the calculated setting candidate of the speed limit value is equivalent to the speed limit value currently set. At Step S1904, if determining that they are equivalent, the comparator unit 1801 resets the counter n so that 1 is set in the counter n at Step S1905.

Furthermore, at Step S1906, the setting value display control unit 602 of the display control unit 304 displays the speed limit value currently set by the display level n.

On the other hand, at Step S1903, if determining that a setting candidate of the speed limit value having the middle reliability has not been calculated, the comparator unit 1801 goes forward to Step S1907. Also, at Step S1904, if determining that the calculated setting candidate of the speed limit value is not equivalent to the speed limit value currently set, the comparator unit 1801 goes forward to Step S1907.

At Step S1907, the setting value display control unit 602 of the display control unit 304 increments the counter n. Also, at Step S1908, the setting value display control unit 602 of the display control unit 304 displays the speed limit value currently set by the display level n.

In this way, in the embodiment, the display level of the speed limit value is changed as the time passes (or the travel distance accumulates) since a speed limit value based on a road sign has been set. In addition to that, the regressing of the reliability of the speed limit value currently set in the degrading direction is updated based on the setting candidate of the speed limit value.

Then, if the speed limit value currently set is equivalent to the calculated setting candidate of the speed limit value, it is determined that the reliability does not go in the degrading direction, and resets the display level (back into the initial state). This makes it possible to display a speed limit value based on a road sign by the display level in accordance with the actual regressing of the reliability in the degrading direction.

<3. Display Examples on Display Unit in Set Control System According to the Embodiment>

Figure 20:
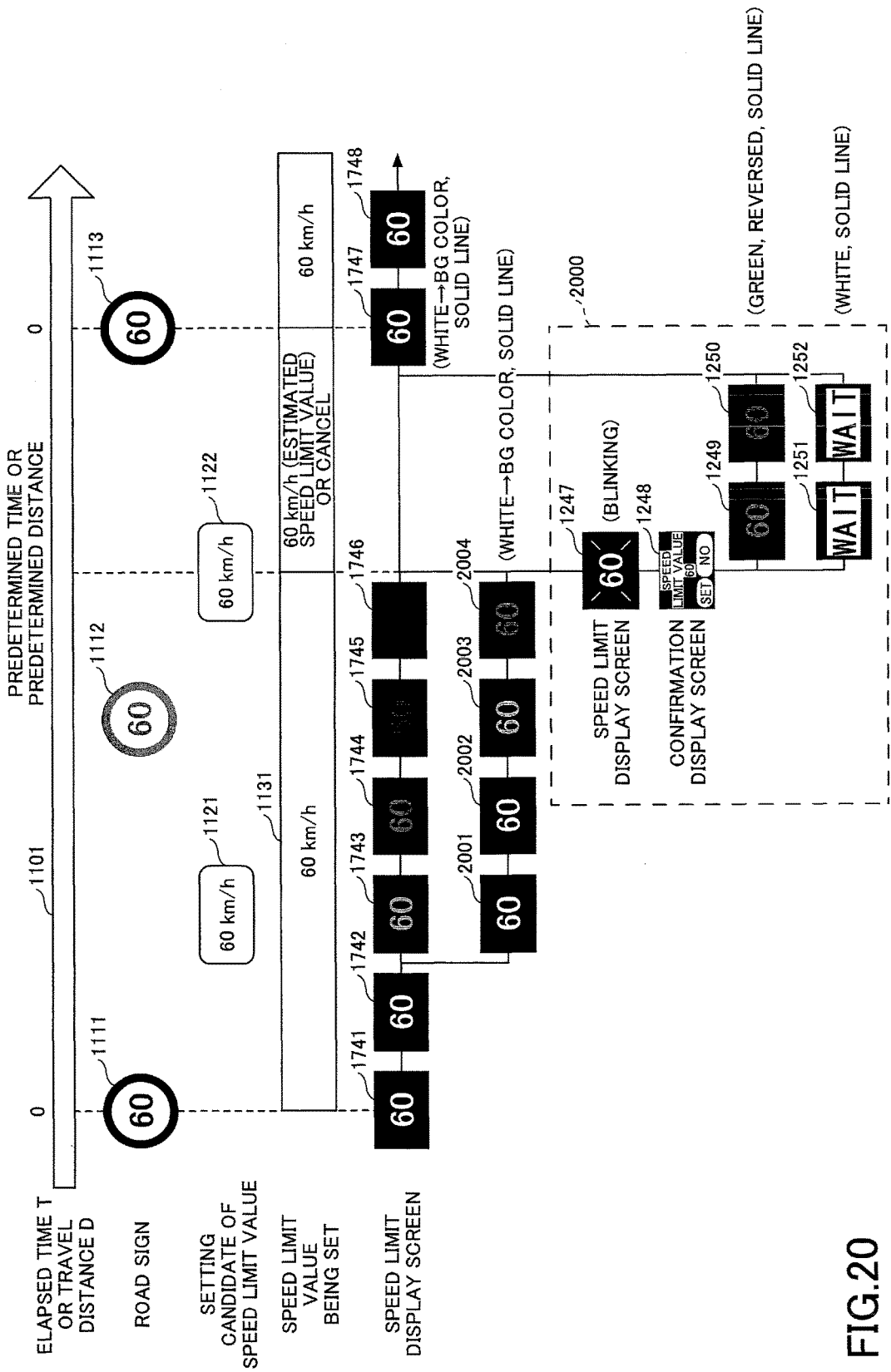
FIG. 20 is a diagram that illustrates display examples on a display unit according to the third embodiment.

Next, display examples on the display unit 131 in the setting control system 100 according to the embodiment will be described. FIG. 20 is a diagram that illustrates display examples on the display unit 131 in the setting control system 100 according to the third embodiment. Here, elements that are substantially the same as those in FIG. 17 are assigned the same reference numbers, and their description is omitted.

As illustrated in FIG. 20, before the time passes (or before the travel distance accumulates), the speed limit value is displayed on the speed limit display screens 1741 and 1742 by the display level 1. In contrast to this, after the time has passed (or after the travel distance has accumulated), the reliability determination unit 303 calculates a setting candidate of the speed limit value.

Assume here that a setting candidate of the speed limit value "60 km/h" having the middle reliability is calculated. In this case, since the speed limit value currently set is equivalent to the calculated setting candidate of the speed limit value, the setting value display control unit 602 of the display control unit 304 resets the display level n. Consequently, the speed limit value currently set is displayed on a speed limit display screen 2001 by the display level 1.

Note that if a setting candidate of the speed limit value having the middle reliability has not been calculated by the reliability determination unit 303, or if a setting candidate of the speed limit value having the middle reliability has been calculated, but the calculated value is not equivalent to the speed limit value currently set, the display level is not reset. Therefore, the speed limit value is displayed on the speed limit display screen 1743 by the display level 2, and the speed limit value is displayed on the speed limit display screens 1744, 1745, and 1746 by the display levels 3, 4, and 5, respectively.

Note that even if the display level n has been reset, after the time passes since the reset (or the travel distance accumulates), the display level n is changed again.

Speed limit display screens 2003 and 2004 show the speed limit value displayed again by the display levels 2 and 3, respectively, once the display level n has been reset, and after the time has passed since the reset (or the travel distance has accumulated).

Note that when the display level is to be changed, the reliability determination unit 303 calculates a setting candidate of the speed limit value.

In other words, although not explicitly illustrated in FIG. 20, when displaying the speed limit display screen 2003, the display control unit 304 determines whether the speed limit value currently set is equivalent to the calculated setting candidate of the speed limit value, and if equivalent, resets the display level.

Note that regardless of resetting the display level, the measurement continues for the elapsed time T or the travel distance D since the speed limit value has been obtained based on the road sign 1111. Then, when the elapsed time T has reached the predetermined time or the travel distance D has reached the predetermined distance, Steps S708 to S711 in FIG. 19 are executed.

Consequently, the estimated speed limit value calculated based on the information other than the road sign is displayed on the speed limit display screens 1249 and 1250 by the display aspect specified for the reliability.

Note that in the example in FIG. 20, although the dotted line 2000 encircles the same display examples as in FIG. 12, they may be the display examples in FIG. 13 or FIG. 14.

<4. Summary>

As clarified by the above description, in addition to the configuration of the second embodiment, the third embodiment is configured, to update the display level for displaying the speed limit value based on a road sign, which is normally controlled assuming that the reliability goes in the degrading direction due to the elapsed time and the accumulated travel distance, based on the setting candidate of the speed limit value; and to reset the display level if the speed limit value currently set is equivalent to the calculated setting candidate of the speed limit value, which implies that the reliability does not go in the degrading direction.

Consequently, according to the embodiment, in the setting control system 100, the driver can correctly grasp the regressing of the reliability of a speed limit value based on a road sign in the degrading direction.

[Other Embodiments]

The second embodiment is configured to have the color of characters showing the speed limit value getting close to the background color of the speed limit display screen, as the time passes (or the travel distance accumulates) since the speed limit value has been set based on a road sign. However, it may be configured to have the color of characters showing the estimated speed limit value getting close to the background color of the speed limit display screen, as the time passes (or the travel distance accumulates) since the estimated speed limit value has been set based on information other than a road sign.

The first to third embodiments are configured to indicate to the driver that the vehicle speed is being limited by a speed limit value having an inferior reliability, by the displaying. However, the indication to the driver is not limited to the displaying, but by making sound. For example, a notice of switching or canceling to the driver may be done by voice messages.

Also, the first to third embodiments are configured to measure the elapsed time T or the travel distance D since a speed limit value based on a road sign has been obtained, and to switch the speed limit value once the elapsed time T has reached the predetermined time, or the travel distance D has reached the predetermined distance. However, the present invention is not limit that, but the system may be configured to measure both the elapsed time T and the travel distance D, and to switch the speed limit value once the elapsed time T has reached the predetermined time, and the travel distance D has reached the predetermined distance.

Also, the first to third embodiments are configured to switch the speed limit value set as the upper limit speed value, based on the elapsed time T or the travel distance D since a speed limit value based on a road sign has been obtained. However, the condition for switching the speed limit value is not limit to the elapsed time T or the travel distance D, but another condition may be adopted.

Note that the present invention is not limited to the configurations described in the embodiments and those combined with the other elements here. These can be changed within the scope of the present invention, and can be appropriately defined depending on usage.

The present application is based on and claims the benefit of priority of Japanese Priority Application No. 2015-106825, filed on May 26, 2015, the entire contents of which are hereby incorporated by reference.

The invention claimed is:

1. A control system for a vehicle, the control system comprising:

an imaging device configured to capture an image including a sign that represents a speed limit value on a road on which the vehicle is traveling; and an electronic control unit (ECU) configured to:

recognize a recognition speed limit value based on the image captured by the imaging device;

set a vehicle speed limit value based on the recognition speed limit value;

limit a vehicle speed of the vehicle based on the set vehicle speed limit value;

measure at least one of an elapsed time and a travel distance, since the set vehicle speed limit value has been set;

estimate an estimation speed limit value on the road on which the vehicle is traveling upon at least one of: (i) the measured elapsed time reaching a predetermined time, and (ii) the measured travel distance reaching a predetermined distance;

control a display device to display the estimation speed limit value;

determine a reliability of the estimation speed limit value;

determine whether the reliability of the estimation speed limit value is a predetermined reliability in response to a predetermined time passing since the estimation speed limit value has been displayed on the display device; and upon the estimation speed limit value being displayed on the display device, determine, based on the reliability of the estimation speed limit value, whether a switching command to switch the set vehicle speed value to the estimation speed limit value has been input;

upon determining that the, reliability of the estimation speed limit value is the predetermined reliability, switch the set vehicle speed limit value to the estimation speed limit value.

2. The control system for the vehicle according to claim 1, wherein the ECU is configured to determine that the switching command has been input, upon the determination that the reliability of the estimation speed limit value is the predetermined reliability.

3. The control system for the vehicle according to claim 1, wherein the ECU controls the display device to display the estimation speed limit value by a display aspect depending on the determined reliability.

4. The control system for the vehicle according to claim 1, wherein the ECU controls the display device to display the vehicle speed limit value by a display aspect corresponding to at least one of the elapsed time and the travel distance, until the measured elapsed time reaches the predetermined time, and/or until the measured travel distance reaches the predetermined distance.

5. The control system for the vehicle according to claim 4, wherein:

the ECU is configured to estimate the speed limit value on the road on which the vehicle is traveling, before the measured elapsed time reaches the predetermined time, and/or before the measured travel distance reaches the predetermined distance, and upon the speed limit value being equivalent to the estimated speed limit value before the measured elapsed time reaches the predetermined time, and/or before the measured travel distance reaches the predetermined distance, the ECU controls the display device to display return to the display aspect of the vehicle speed limit value.

* * * * *